United States Patent [19]

Ward et al.

[11] Patent Number: 5,463,555
[45] Date of Patent: Oct. 31, 1995

[54] SYSTEM AND METHOD FOR INTEGRATING A BUSINESS ENVIRONMENT WITH A PROCESS CONTROL ENVIRONMENT

[75] Inventors: Dennis M. Ward, Sherwood Park, Canada; Ronny A. W. Aerts, Kloosterzande; Jean-Pierre Meijer, Malden, both of Netherlands; Silke Arnswald, Gnarrenburg, Germany; Gerald A. Sandoval, Midland, Mich.; Herbert Schneemann, Stade, Germany

[73] Assignee: The Dow Chemical Company, Midland, Mich.

[21] Appl. No.: 127,876

[22] Filed: Sep. 28, 1993

[51] Int. Cl.⁶ .................................... G06F 17/60
[52] U.S. Cl. ..................... 364/468; 364/149; 364/401
[58] Field of Search ................................ 364/468, 131, 364/138, 150, 149, 401–403; 395/906, 904, 926

[56] References Cited

U.S. PATENT DOCUMENTS

| | | | |
|---|---|---|---|
| 4,459,663 | 7/1984 | Dye | 364/200 |
| 4,796,194 | 1/1989 | Atherton | 364/468 |
| 4,887,218 | 12/1989 | Natarajan | 364/468 |
| 5,093,794 | 3/1992 | Howie et al. | 364/468 |
| 5,119,318 | 6/1992 | Paradies et al. | 364/468 |
| 5,148,370 | 9/1992 | Litt et al. | 364/468 |
| 5,161,110 | 11/1992 | Dorchak | 364/468 |
| 5,233,533 | 8/1993 | Edstrom et al. | 364/468 |
| 5,260,866 | 11/1993 | Lisinski et al. | 364/401 |
| 5,357,439 | 10/1994 | Matsuzaki et al. | 364/468 |

OTHER PUBLICATIONS

Manufacturing Systems, "Understand Your Requirements Before Choosing an MES", Nicholas J. Samanich, Jan., 1993, pp. 34–36, 38 and 39.

Manufacturing Systems, "Manufacturing Software Heads for the 21st Century", Richard Bourke, Jan. 1993, pp. 18, 19, 22, 24, 26, 30, 32, and 35.

SAP AG, System Description, "DASS Plant Control System", Apr., 1991, pp. 1–29.

"CAPISCE for Process Industries", Oswald Wiester. Publication, dates, and page numbers unknown.

SAP AG, Commercial Literature, "Communication Module for Linking of Subsystems to RM–DASS, RM–LVS, RM–QSS, RP", Nov. 2, 1992, pp. 1–20.

Primary Examiner—James P. Trammell

[57] ABSTRACT

A system and method for integrating a business transaction processing system with a process control system provides a computer integrated manufacturing environment. The manufacturing execution system receives work orders from the business transaction processing system and obtains enrichment data to enhance the work order. The manufacturing execution system uses the enrichment data and rules contained in a plant model database to generate setpoints based on the received work orders. The setpoints include detailed information required by the process control system to manufacture the product specified by the work order. The setpoints are transmitted to the process control system for manufacture of the required materials. The manufacturing execution system collects the manufacturing data resulting from the execution in response to the work order by the process control system and processes this manufacturing data to provide summary information on manufacturing processes and to provide inventory information data. This data is then transmitted to the business transaction processing system so that business records may be maintained.

42 Claims, 11 Drawing Sheets

SYSTEM AND METHOD FOR INTEGRATING A BUSINESS ENVIRONMENT WITH A PROCESS CONTROL ENVIRONMENT

BACKGROUND OF THE INVENTION

1. Field of the Invention

The present invention relates generally to computer integrated manufacturing and, more particularly, to a system and method for integrating a computerized business system with a computerized manufacturing system.

2. Related Art

Recent developments in computer and computer-related technology have enabled the use of computers in numerous business applications. Almost every facet of today's industry is implemented using computer systems in some manner. Computerization has become necessary for businesses to remain in a competitive posture.

Computer systems are used to automate processes, manage large quantities of information, and provide fast, flexible communications. One area enjoying widespread computerization is that of the business environment. Many businesses from small stores, to professional offices and partnerships, to large corporations have computerized their business functions to some extent. Computerized business functions can include billing, order-taking, scheduling, inventory control, record keeping, and the like. Such computerization can be accomplished by using a business applications system, running business applications software packages.

There are many business applications software packages available to handle a wide range of business functions, including those discussed above. One such package is the SAP R/2 System available from SAP America, Inc., 625 North Governor Printz Blvd., Essington, Pa. 19029.

The SAP R/2 System is a business applications software package designed to run on an IBM or compatible mainframe in a CICS (Customer Interface Control System) or IMS (Information Management System) environment. For example, SAP may use CICS to interface with terminals, printers, databases, or external communications facilities such as IBM's Virtual Telecommunications Access Method (VTAM).

SAP is a modularized, table driven business applications software package that executes transactions to perform specified business functions. These functions may include order processing, inventory control, and invoice validation; financial accounting, planning, and related managerial control; production planning and control; and project accounting, planning, and control. The modules that perform these functions are all fully integrated with one another.

Another area that has been computerized is the manufacturing environment. Numerous manufacturing functions are now controlled by computer systems. Such functions can include real-time process control of discrete component manufacturing (such as in the automobile industry) and process manufacturing (such as chemical manufacturing through the use of real-time process control systems).

Directives communicated from the business systems to the manufacturing systems are commonly known as work orders. Work orders can include production orders, shipping orders, receiving orders, and the like.

However, the computerization of business systems within the business environment and the computerization of manufacturing systems within the manufacturing environment have followed separate evolutionary paths. This often results in an incompatibility between the different systems. Specifically, work orders communicated from the business systems may have a context and a format which are not readily compatible with the context and format recognized by the manufacturing systems. Additionally, the business systems may not provide all the information necessary for the manufacturing systems to carry out designated functions.

The inventors are not aware of a generic computerized solution that offers an efficient, automated way to integrate the computerized business systems with the full spectrum of computerized manufacturing systems.

According to conventional wisdom, integrating the computerized business systems with the computerized manufacturing systems often requires a human interface. Consequently, a high degree of automation of plant operations is not accomplished, and neither is full automation of inventory operations. In this solution, work orders are generated by the business systems indicating parameters such as: the product to be manufactured, the required date, the raw materials needed, and the like. Human operators receive the work order along with these parameters and manually prepare work order instructions that enable the computerized manufacturing systems to manufacture the product specified by the work order. Human operators are also responsible for collecting data from the manufacturing systems and providing this data to the computerized business systems.

Another conventional solution is to implement a custom, computerized interface between the business systems and the manufacturing systems. However, these custom solutions are usually tailored to a specific situation. As a result, the tailored solution is not portable into other situations without major modifications. Additionally, these solutions are costly to maintain over time because of inherent difficulties in accommodating change.

In many manufacturing plants, multiple real-time process control systems are implemented to control manufacturing. One problem with having multiple real-time process control systems is that all interfaces to those computers are not necessarily uniform. In such a situation, a process information system (also referred to as a process control supervisory computer) may be provided to serve as a consistent interface to multiple, real-time process control systems having different interface characteristics. The process information system allows operators to provide data to specific real-time process control systems and retrieve data about the manufacturing process from those real-time process control systems.

In typical manufacturing plants, there are diverse manufacturing situations calling for different solutions. These situations include characterizing manufacturing output as relating to either a period of time during which manufacturing occurs or a quantity of material manufactured. In other words, output can be characterized with either time-based units or physical quantity units.

For the purpose of this document, these characterizations are described in terms of two types of manufacturing paradigms: batch manufacturing and continuous manufacturing. The batch manufacturing paradigm depicts manufacturing as producing a finite quantity of products in physical-quantity units such as lots or batches. The lots or batches manufactured may not be consistent from one manufacturing run to the next. The continuous manufacturing paradigm, on the other hand, depicts manufacturing as producing a theoretically consistent product over time in an ongoing manner. Both paradigms can be used to characterize the manufacturing output of a given plant in order to fulfill different business needs. A continuous plant can be defined as a theoretical implementation of the continuous paradigm. A batch plant can be defined as a theoretical implementation of the batch paradigm.

Continuous plants generally manufacture a fixed set of products, while batch plants are generally capable of being reconfigured to manufacture many different products using many different recipes. For continuous plants, the production unit can be described in terms of a set time frame. However, for batch plants, the unit of manufacture is not a set time frame. Instead, the unit of manufacture is a lot which can be defined by certain characteristics. These characteristics can include, for example, an event indicating the time of the start of the lot, an event indicating the time of the completion of the lot, a value indicating the magnitude of the lot, and other quality related attributes which are characteristic of all subparts or subdivisions of the lot.

Many batch plants use the same equipment to make several different products according to different recipes. Because different recipes are used and different product requirements exist for each batch, information handling requirements for each batch are different. In these plants, it is desirable to report different sets of manufacturing information for different recipes manufactured. In contrast, reporting requirements for continuous plants are usually ideally met by providing the same set of manufacturing data at regular, periodic intervals.

Apparently, conventional interfaces to meet all of the needs for collecting, retrieving, and reporting data for a multitude of batch and continuous plants incorporating different real-time process control systems do not exist.

An example of a conventional solution is the DASS system, available from SAP AG, of Waldorf, Germany. The DASS system appears to be targeted at creating a manufacturing schedule rather than automatically creating a production order instruction and transmitting it to a real-time process control system. DASS receives information used in setting manufacturing schedules from the SAP R/2 package, and collects data from the real-time process control system to provide status information on those items scheduled. DASS does not appear to provide a mechanism for executing work orders whereby setpoints are computed and transmitted to the real-time process control systems in the computerized manufacturing system. Further, DASS does not appear to provide a generic solution to connect a computerized business system to a computerized manufacturing system which will collect data relating to the execution of work orders, and, therefore, does not appear to provide a comprehensive manufacturing execution system interface solution.

What is needed is a computerized interface between computerized business systems in the business environment and computerized manufacturing systems in the manufacturing environment that enables a true computer integrated manufacturing environment. The ideal computerized interface should be capable of handling the information needs of a full spectrum of manufacturing processes, and should be able to interface to a number of different real-time process control systems.

SUMMARY OF THE INVENTION

The present invention is directed to a system and method for integrating the business systems of a corporation or business with its manufacturing systems to enable computer integrated manufacturing. The present invention, a manufacturing execution system, provides an automated, bi-directional interface between at least one computerized business system and at least one computerized manufacturing system to achieve computer integrated manufacturing.

A work order, specifying a manufacturing operation or a set of manufacturing operations, is created in the business system and distributed to the manufacturing execution system. The work order includes work order target data which defines the computerized business system's expectation of what data will be generated in the manufacturing operations.

The manufacturing execution system receives the work order and generates a work order instruction which also includes work order target data. To create a work order instruction, the manufacturing execution system translates the work order by mapping business system processing codes into manufacturing system codes. The manufacturing execution system expands the work order to include additional information required by the computerized manufacturing system in executing the work order. This expansion is known as enrichment.

In response to the work order, the manufacturing execution system further creates a manufacturing cycle order to identify data related to one manufacturing cycle to be executed on a specific workcenter. The manufacturing cycle order includes manufacturing cycle order target data which is an interpretation of manufacturing data within the work order instruction.

The manufacturing execution system also computes or determines setpoints to be included as attributes of the work order instruction. The setpoints comprise target values or other key information. The setpoints are input to a computerized manufacturing system which controls a manufacturing operation executing in the manufacturing environment.

The manufacturing execution system defines a set of configurable functions that can enable articulation of a plant model within the context of a generic workcenter. This generic model defines the data and relationships necessary to characterize a type of workcenter for a particular manufacturing operation. Attributes of specific workcenters within a generic workcenter type are then mapped into the generic definitions. This mapping facilitates interpretation of a work order instruction to a plurality of different types of real-time process control systems.

Once the work order instruction, including enrichment information and setpoints, is completed, the setpoints are communicated to the proper real-time process control system within the computerized manufacturing systems.

The communication can be released to the computerized manufacturing system in a manual or automatic manner depending on security and/or safety considerations. In one embodiment, the communication is automatically transmitted between the manufacturing execution system and the computerized manufacturing system.

The process control system within the computerized manufacturing system then executes manufacturing operations related to the work order. The execution is performed in accordance with parameters set forth by the setpoints.

During the execution of the manufacturing operation related to the work order instruction, the process control system generates manufacturing data regarding the execution. Upon receipt of specified triggering events, the manufacturing execution system retrieves related data and stores it in a local database. The manufacturing execution system uses this retrieved data to compute information required by the computerized business system. This information includes data concerning manufacturing in response to the work order such as raw materials used, amount of product manufactured, time to execute the manufacturing cycle, and the like.

The manufacturing execution system calculates data points based on the information received from the process control system. These data points include information such as lot quantities, lot qualities, lot efficiencies, and the like. Some or all of these data points and the data received by the manufacturing execution system are organized for transmission to the business environment and for inclusion in reports. Reports are generated according to both standard and custom reporting formats.

The data computed and organized is transmitted to the computerized business system where it is used for plant business purposes such as computation and maintenance of accurate inventory information. The transmitted data provides the business environment with information regarding finished products manufactured, raw material consumption, and actual production times.

The manufacturing execution system operates by creating at least one manufacturing cycle order in response to a work order and its associated and derived work order instruction. The manufacturing execution system further creates additional manufacturing cycle orders if they are needed by the computerized manufacturing system to fulfill the work order.

A manufacturing cycle order, for example, may relate to one reactor load. Manufacturing cycle orders comprise scheduling information such as target dates and times and have manufacturing cycle order target data, such as raw materials reservations, linked to them. The manufacturing cycle order relates to a manufacturing cycle scheduled to execute on a certain workcenter at a certain time to fulfill a work order.

A generic data concept is provided which allows data for manufacturing processes, workcenters, materials, and other resources to be defined on a generic level. This allows a single instance of resource attribute definitions to apply to numerous specific resources within a genus. The use of a generic data concept to summarize data definitions saves storage space and reduces support and maintenance time. The generic data concept enables a group of workcenters having similar properties, design features, components, end products, raw materials, and attributes to inherit many of their individual (or specific) rules and associated data structures from a generic set of rules and associated data structures. This approach enables a new feature of the rules and data structures for the group of workcenters to be defined once at the generic level and applied to all specific workcenters in the group. A further feature of the generic data concept is provided through a material mapping facility which is further discussed in another part of this specification.

A computer-based system for integrating a computerized business system with a computerized manufacturing system is presented. The computerized business system creates a work order containing target data specifying a product to be manufactured, and the computerized manufacturing system requires a setpoint to manufacture the product. The computer-based system comprises a business systems interface configured to receive the work order from the computerized business system and to extract the target data from the received work order; and an event response processor coupled to the business system interface and configured to generate the setpoint by applying at least one rule to the target data. The rule allows computation of the setpoint to meet specific requirements of the computerized manufacturing system.

A computer-integrated manufacturing system is presented. The system comprises a computerized business system configured to create a work order having target data specifying a product to be manufactured, a computerized manufacturing system configured to manufacture the specified product in response to at least one setpoint, and an event response processor coupled to the computerized business system and the computerized manufacturing system, configured to generate said at least one setpoint by applying at least one rule to said target data and to provide the setpoint to the computerized manufacturing system. The rule allows computation of the setpoint to meet specific requirements of the computerized manufacturing system.

A computer-based method of integrating a computerized business system with a computerized manufacturing system is presented. The method comprises the steps of: (1) receiving a work order from the computerized business system, wherein the work order comprises target data specifying a product to be manufactured by the computerized manufacturing system; (2) applying at least one setpoint calculation rule to the target data to compute a setpoint, wherein the setpoint is used by the computerized manufacturing system to manufacture said specified product; and (3) sending the setpoint to the computerized manufacturing system.

A computer-based system for integrating a computerized business system with a computerized manufacturing system is presented. The system comprises: (1) an interface means for receiving a work order from the computerized business system, wherein the work order comprises target data specifying a product to be manufactured by the computerized manufacturing system; and (2) a setpoint determination means, coupled to the computerized manufacturing system, for applying at least one setpoint calculation rule to the target data to compute a setpoint required by the computerized manufacturing system to manufacture the specified product.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

1. Overview
2. Definitions
3. Description of the Basic Steps of the Invention
   3.1 Business Systems Interface
   3.2 Optional Enrichments and Setpoint Computation
   3.3 Configuration Management Element
   3.4 Interface to the Manufacturing Environment
   3.5 Data Management and Reporting
   3.6 Data Transfers to the Business Environment
4. Manufacturing Cycle Orders
5. Manufacturing Execution System Data Flow
6. Scheduling
   6.1 Copying Manufacturing Cycle Orders
   6.2 Modifying Manufacturing Cycle Orders
   6.3 Modifying Manufacturing Cycle Order Target Data
7. Generic Data Concept
8. Enrichment and Setpoint Calculations
   8.1 Enrichment
   8.2 Setpoint Calculations
9. Plant Model Database
10. Batch and Continuous Accounting
    10.1 Batch Accounting
    10.2 Continuous Accounting
11. Inventory Support
12. Conclusion

1. Overview

The present invention is directed to a system and method for integrating a computerized business system in a business environment with a computerized manufacturing system in a manufacturing environment. A computerized manufacturing execution system is provided as an automatic bi-directional interface between the computerized business system and the computerized manufacturing system to accomplish computer integrated manufacturing.

Under normal operations, plant operations personnel are not required to manually translate work orders from the business environment into process control instructions and then manually collect work data and enter it back into the business environment. The present invention automates the interface between the computerized business systems and the computerized manufacturing systems.

Figure 1:
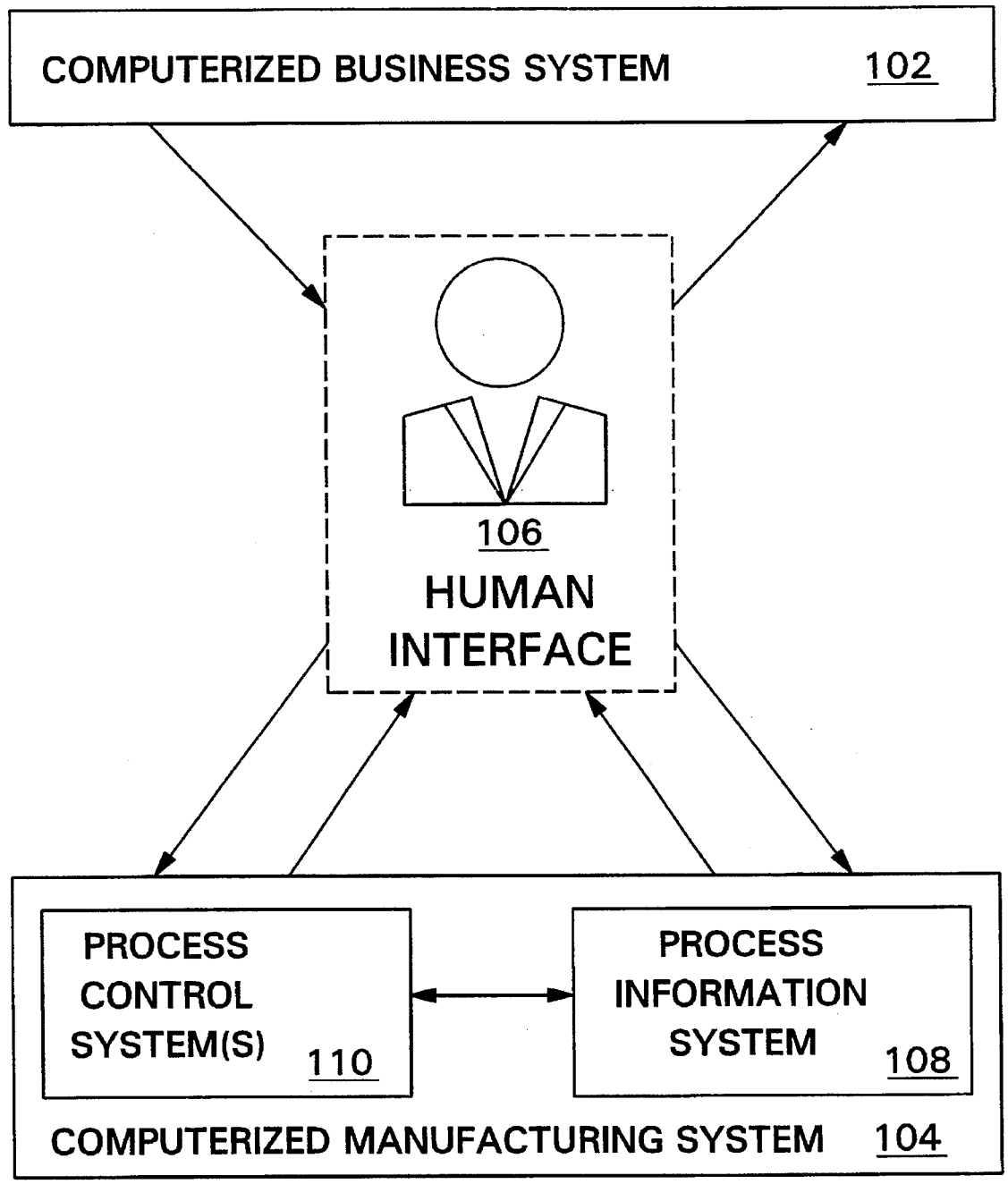
FIG. 1 is a block diagram illustrating a conventional human interface between a computerized business system and a computerized manufacturing system.

FIG. 1 is a block diagram illustrating a conventional technique for integrating computerized business systems with computerized manufacturing systems. Referring to FIG. 1, in a conventional system, business functions are computerized using a computerized business system 102. Computerized business system 102 is a computerized system that performs functions including order scheduling, inventory tracking, and quality control. An example of computerized business system 102 is the SAP R/2 system described above.

A typical computerized business system 102 can perform functions such as order scheduling for each product based on customer orders received, compiling information pertaining to product inventory and raw materials inventory, and other work information. Inventory tracking is primarily performed based on communications concerning materials consumed (or dedicated to manufacturing) and products manufactured. Inventory tracking can be further based on reports regarding products shipped from a shipping department and materials arriving at a receiving department.

A computerized manufacturing system 104 includes an optional process information system 108 and real-time process control systems 110 (referred to as process control systems 110). Process information system 108 aids work and operation staff of a manufacturing plant in monitoring and executing their manufacturing process. Process information system 108 provides an interface to at least one process control system 110. Part of the functionality of process information system 108 is to provide a standard interface to multiple process control systems 110.

It should be noted that all or part of the functionality of process information system 108 could be included in process control system(s) 110. If all of the required functionality is included in process control system 110, process information system 108 is not needed.

According to conventional techniques, computerized business systems 102 and computerized manufacturing systems 104 are not fully integrated systems. The interface required is a human interface 106. In most instances, human interface 106 obtains a work order for a product from the computerized business system 102. The work order has associated schedule requirements (e.g., delivery time). Human interface 106 then must manually transfer this information to computerized manufacturing system 104.

Similarly, manufacturing data are retrieved by human interface 106 from process information system 108 or directly from process control systems 110 which interface with the manufacturing apparatuses such as reactors, extruders, and the like. These data are then manually entered to update inventory information in computerized business system 102.

Computerized business system 102, however, is concerned with inventory, quality, and manufacturing scheduling, but has no direct or automatic interface to computerized manufacturing system 104. The business and manufacturing environments are dependent upon human interface 106 to compute setpoints for computerized manufacturing system 104 out of the information from computerized business system 102. A human interface 106 is also required to gather manufacturing-related information from computerized manufacturing system 104 for input into computerized business system 102.

Several disadvantages arise out of this dependency on human interface 106. One disadvantage is that human interface 106 is often slow in comparison to a computerized interface. Also, human responses to a work order are not always consistent. Additionally, humans are more prone to error and are more likely to implement different solutions to the same type of problem than a computerized interface.

Process information system 108 may provide manufacturing information to process control systems 110 in response to manual entry, and it may gather manufacturing-related information and provide this information to the human operators. Process information system 108 is ideally suited to this task because it is designed to interface with process control system 110 directly.

Figure 2:
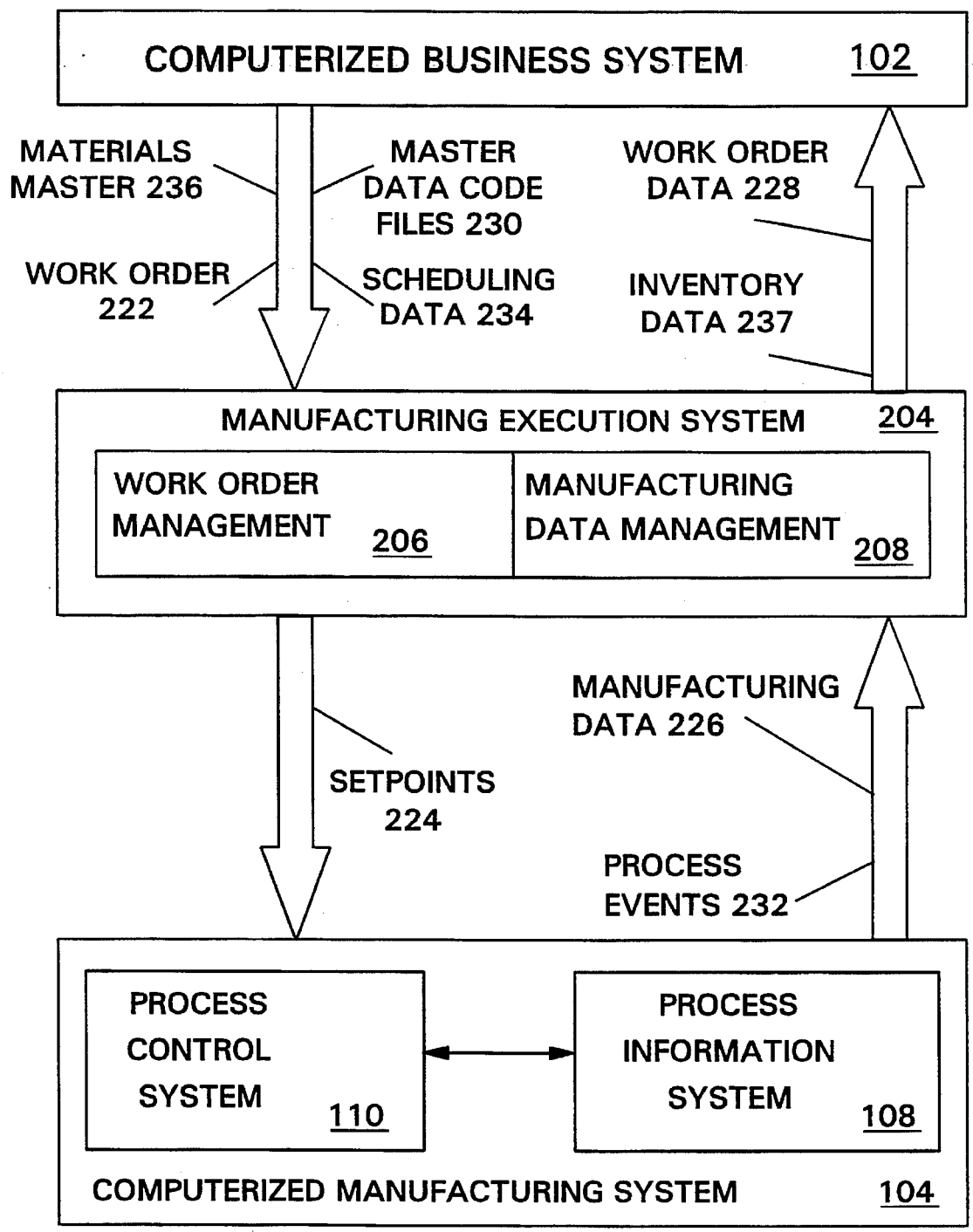
FIG. 2 is a block diagram illustrating the manufacturing execution system according to the present invention and its interfaces to a computerized business system and a computerized manufacturing system.

FIG. 2 is a functional block diagram illustrating a manufacturing execution system according to the present invention, and its interfaces with the business and manufacturing environments. Referring to FIG. 2, a computerized business system 102 is a computerized system that is part of the business environment of a manufacturing facility. Computerized business system 102 can be configured to perform functions such as determining manufacturing schedules based on customer orders, maintaining inventory information based on the manufacturing process and sales, business planning, record keeping, and the like. In one embodiment, computerized business system 102 is typical of a business transaction processing system. An example of computerized business system 102 is the SAP R/2 system described above.

Computerized manufacturing system 104 is an automated system for controlling product manufacturing. Process control system 110, as a part of computerized manufacturing system 104, controls the manufacturing of materials based on input information such as required quantities, product attributes, raw materials to be used, manufacturing equipment, process operations and the sequence thereof, and the like.

Manufacturing execution system 204 automates the interface between at least one computerized business system 102 and at least one computerized manufacturing system 104. The computerized manufacturing system may include at least one process control system 110. In one embodiment, manufacturing execution system 204 can be described in terms of two key functions: work order management 206, and manufacturing data management 208.

Computerized manufacturing system 104 can be implemented in conjunction with a process information system 108. The data transport functionality included in process information system 108 varies depending on the actual interface required to process control system 110. The data transport functionality provided by process information system 108 could be included in manufacturing execution system 204 or process control systems 110. Further, if process control systems 110 are provided such that they all share standard interface characteristics, the need for some or all of the functionality of process information system 108 is obviated.

In this document, manufacturing execution system 204 is often described as interfacing to a single computerized business system 102 and a single computerized manufacturing system 104. This was done for ease of description. It should be noted that manufacturing execution system 204 can be used to provide computer integrated manufacturing environment in plants comprising one or more computerized business systems 102 and one or more computerized manufacturing systems 104.

Additionally, the architecture depicted and described with respect to FIG. 2 was chosen to best illustrate the overall functionality of the claimed invention. Splitting the functionality into work order management 206 and manufacturing data management 208, and further inclusion of process information system 108 was done for ease of discussion. Physically, these do not have to be separate and distinct subsystems with the functionalities assigned to each as described herein. It will be apparent to a person of ordinary skill in the relevant art how to implement alternative physical architectures comprising fewer or more "subsystems" which together perform the functionality described herein.

Figure 3:
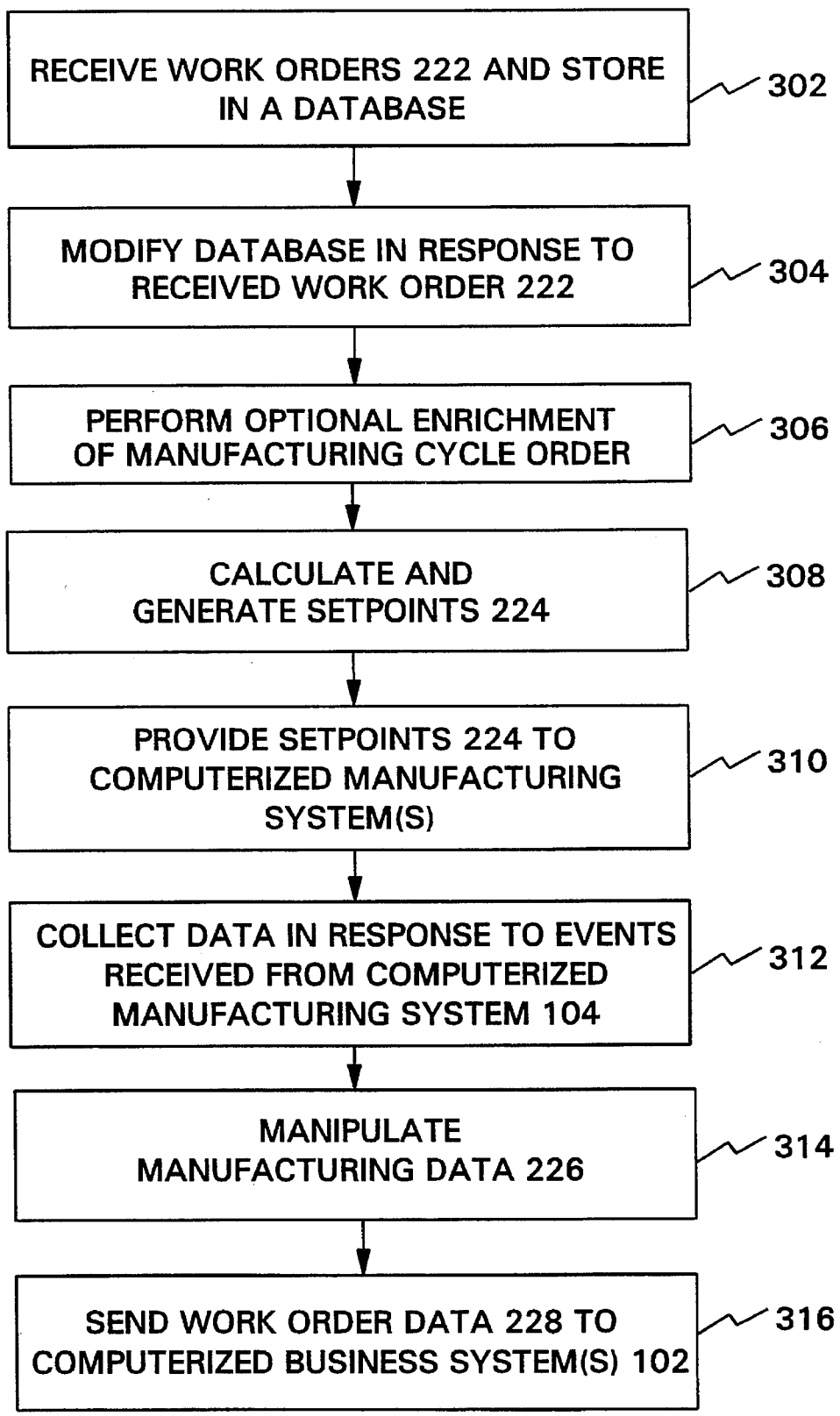
FIG. 3 is a flow chart illustrating the fundamental steps of the present invention.

FIG. 3 is a flow chart illustrating basic steps that are performed by the present invention. Referring to FIGS. 2 and 3, these steps will now be described. In a step 302, a work order 222 is sent from computerized business system 102, received by manufacturing execution system 204, and stored in a database within manufacturing execution system 204.

Work order 222 is a message generated by computerized business system 102. Work order 222 can be the outcome of a scheduling process performed by computerized business system 102. The scheduling process may take into consideration factors such as product inventory, manufacturing schedules, customer orders and the like. In addition to an order to manufacture a product, work order 222 can include additional orders, such as shipping orders, receiving orders, and other plant orders. A work order 222 is an instruction to manufacture, ship, and/or receive a certain quantity of material at a certain time (the start and completion times of a manufacturing cycle can be estimated by the computerized business system 102, and these estimates are indicated in the work order 222).

A work order 222 specifies at least one workcenter to be used in the manufacturing process and specifies anticipated raw material consumption (one form of reservations) for the required manufacturing process.

Additional items that can be sent to manufacturing execution system 204 in step 302 are master data code files 230. Master data code files 230 are used to synchronize the data structures utilized by computerized business system 102, manufacturing execution system 204, and computerized manufacturing system 104. In other words, master data code files 230 are used to ensure that data in computerized business system 102, data in manufacturing execution system 204, and data in computerized manufacturing system 104 usefully map together. In one embodiment materials master 236, is a subset of master data code files 230.

In a step 304, manufacturing execution system 204 modifies a database to hold the work order instructions derived from work order 222. Additionally, manufacturing execution system 204 may perform reasonability checks on the data received with work order 222.

In a step 306, an optional enrichment of the work order instruction and derived manufacturing cycle order is performed. In this step, additional data required to execute the manufacturing cycle order is acquired.

In a step 308, setpoints 224 are generated by manufacturing execution system 204. Setpoints 224 are the instructions needed by computerized manufacturing system 104 and operations personnel to execute work order 222. Setpoints 224 convey sufficient information for process control system 110 (or operators thereof) to initiate proper operations using the correct materials and equipment in the proper sequence. Setpoints 224 are specific manufacturing process settings required by the process control system 110 to help fulfill the requirements of a specific work order 222 (i.e., the requirements of a specific manufacturing cycle).

Setpoints 224 are computed after enrichments are acquired. Reasonability checks and validations are preferably applied to setpoints 224 to help insure reliability. Also, indication may be provided to an operator that setpoints 224 were sent to computerized manufacturing system 104.

In a step 310, setpoints 224 are provided to computerized manufacturing system 104.

In a step 312, manufacturing execution system 204 monitors computerized manufacturing system 104 to collect manufacturing data 226. This collection of manufacturing data is in response to events 232 received from computerized manufacturing system 104 (which is executing the manufacturing cycle order initiated by the setpoints 224). Manufacturing data 226 is collected to provide information to satisfy computerized business system 102 requirements relating to work order 222. This includes inventory data indicating the effects that manufacturing, shipping, and receiving operations have on inventories. Manufacturing data 226 also includes data relating to the manufacturing process that is not of interest to computerized business system 102. Alternative embodiments may be considered wherein some or all of the data are collected by human operators and manually entered into manufacturing execution system 204.

In a step 314, manufacturing data 226 received in step 312 are used by data management and reporting 208 for secondary computations, local reporting to the shop floor control interface 458 (illustrated in FIG. 4), and message formulation to provide work order data 228 for computerized business system 102, and to provide other data for plant reporting or for analysis of the manufacturing process. Work order data 228 may include detail and summary information on manufacturing processes. Work order data 228 may also include inventory data 237 which may represent quantities such as raw materials used, packaging materials used, and products manufactured. Work-order data 228 also can include information indicating data actions that computerized business system 102 should take with the contents of the work order data 228.

In a step 316, work-order data 228 is sent to computerized business system 102. This step can include translation from manufacturing execution system 204 specific codes to computerized business system 102 codes where required.

The preceding general description provides a high-level overview of manufacturing execution system 204. Each of the features and steps discussed above and additional features and steps are described in greater detail below.

2. Definitions

"Accounting," in the context of manufacturing execution system 204, refers to functions that can include collection, integration, calculation, validation, and reporting of data. Manufacturing execution system 204 accounts for this data using two methods, Batch Accounting and Continuous Accounting, as defined below. A given plant may use either or both of these methods.

An "Adjustment" is required to modify data which a human determines is unacceptable. Adjustments are usually acquired from a human being (usually via a keyboard, bar code input, mouse, light pen, or other like means).

"Batch Accounting" refers to functions that can include collection, integration, calculation, validation, and reporting of data for a manufacturing cycle within the batch paradigm. The data within this paradigm is characterized by indicating the time when manufacturing of a lot begins, the time of the completion of the lot, the magnitude of the lot, and other quality-related attributes that are characteristic of lot manufactured. All usages, production, losses, and like data are associated with the lot of product manufactured. The lot is manufactured on at least one workcenter in response to at least one manufacturing cycle order.

"Computerized business system 102" is a transaction processing system for handling business aspects of the plant, defining with inventories, and for creating and scheduling work orders. An example is the SAP system.

"Continuous Accounting" refers to functions that can include collection, integration, calculation, validation, and reporting of data for a fixed time period. In one embodiment, usages, production, losses, and the like are associated with the time period rather than with the lots made during this time period.

"Continuous Data" is process data collected or calculated on a fixed frequency (hour, day) and summarized over time (e.g., day, shift, week, month, year). In one embodiment, continuous data is collected as a function of time.

"Enrichment" is the process of obtaining additional data that are not included in work order 222 but are required for setpoint 224 calculations. The additional data is acquired either by collection, manual input, or table lookup. Enrichment data can include product physical properties, process control requirements, and the like.

An "Event" is a trigger or interrupt received by manufacturing execution system 204 which initiates an action. Events may come from computerized manufacturing system 104 or be generated internally. Events may also be input manually. An event is received by manufacturing execution system 204 at any time. An event can be non-solicited and un-anticipated.

"External System/External Data Source." In addition to getting automatic data from the process control environment, process information environment, and manual inputs, manufacturing execution system 204 can receive data from any other external source. In one embodiment, the external system which is to provide the data is defined for a generic workcenter and updates the manufacturing execution system database with the values for generic resources or enrichments. Examples of External Systems can include LIMS (or Laboratory Information Management Systems) or infrastructural systems (such as network routers capable of sending out events indicating errors, occurrences of node separation, and other like events).

A "Generic Resource" is used within the manufacturing execution system 204 to define a shared data structure and accompanying set of rules for a collection of at least one resource. A generic resource establishes a template that can be referenced by each member of the group of resources.

"Lot Number" identifies a quantity of material with defined quality attributes.

"Manual Input" refers to the entry of data by a human. Such entry can be via keyboard, bar code input, mouse, light pen, or other like means.

A "Manufacturing Cycle Order" is utilized in manufacturing execution system 204 to relate to the execution of one manufacturing cycle performed on one Workcenter. Many manufacturing cycle orders may be needed to fulfill one work order 222.

"Manufacturing Cycle Order Target Data" specifies an amount of finished or intermediate product to be manufactured according to a manufacturing cycle order together with other necessary information to be used in a manufacturing cycle. Manufacturing cycle order target data are transmitted from computerized business system 102 to manufacturing execution system 204. In one embodiment, manufacturing cycle order target data are determined once for an entire work order 222, and setpoints 224 are computed once for all manufacturing cycle orders derived from work order 222, its derived work order instruction, and its associated work order target data.

"Plant Model" comprises calculation rules and a data structure that define rules, definitions, data types, and other instructions to be used by manufacturing execution system 204 in handling work orders 222. The information in the plant model is provided to give manufacturing execution system 204 instructions as to how to proceed with work order handling and event handling for each type of business system or manufacturing system with which manufacturing execution system 204 interfaces. The plant model is maintained in a plant model database.

"Process control system 110" is a system that executes real-time process control methods to control process machinery within at least one workcenter. Process control system 110 contains information about the process such as the quantities of materials used. Setpoints 224 are used by process control system 110 to control the manner in which a product is manufactured.

"Reasonability Checks" are tests performed on data collected or calculated to ensure validity of the data in terms of the expected value of the data item. Every data item may have a reasonability check. The reasonability check can be defined as a Boolean calculation which may refer to other data items (Example: A is valid if A< B+C).

A "Resource" is data for which computerized business system 102 or the plant may be programmed to account. Such data can include materials used, materials manufactured, setup time for a workcenter, machine time for a workcenter, specifications, energy requirements, and the like.

"Setpoints" are the data values determined by manufacturing execution system 204 to control the manufacturing operations related to a manufacturing cycle order.

"Store Location" is a location known to computerized business system 102 where materials can be stored. Store locations can include a room in a warehouse, a tank, a railroad car, and the like. Each store location can be identified within manufacturing execution system 204 using a logical identifier.

A "Validation" is a process by which a human examines data to be used, decides that it is acceptable, and then indicates acceptability by input to the manufacturing execution system 204. A validation is performed where a reasonability check indicates that a human should review the data.

A "Workcenter" is specific production facility, comprising one or more machines and/or one or more people, that can be considered as a single unit for planning and scheduling purposes. Examples of a Workcenter can include one, or a combination of, the following: personnel, equipment such as a batch reactor, a finishing train, an extruder line, and a drumming line. A workcenter can be considered as one unit for purposes of planning, scheduling, operation, and reporting.

A "Work Order" is an instruction communicated from the computerized business system 102 to manufacturing execution system 204. Work order 222 is a request to manufacture a quantity of material by a specified date, and can specify certain workcenters on which to manufacture the product. Work order 222 is the outcome of the scheduling process as performed by the plant production scheduler executing in the computerized business system. Work order 222 provides information from the plant production scheduler to the manufacturing execution system (and the control room operator) on what to manufacture. Work Order 222 can include information such as:

- ■ product type;
- ■ quantity to manufacture (at least one batch);
- ■ which workcenters to be used in manufacturing (at least one);
- ■ when to start/stop each workcenter; and
- ■ which raw materials to use (quantities, sources).

3. Description of the Basic Steps of the Invention

Figure 4:
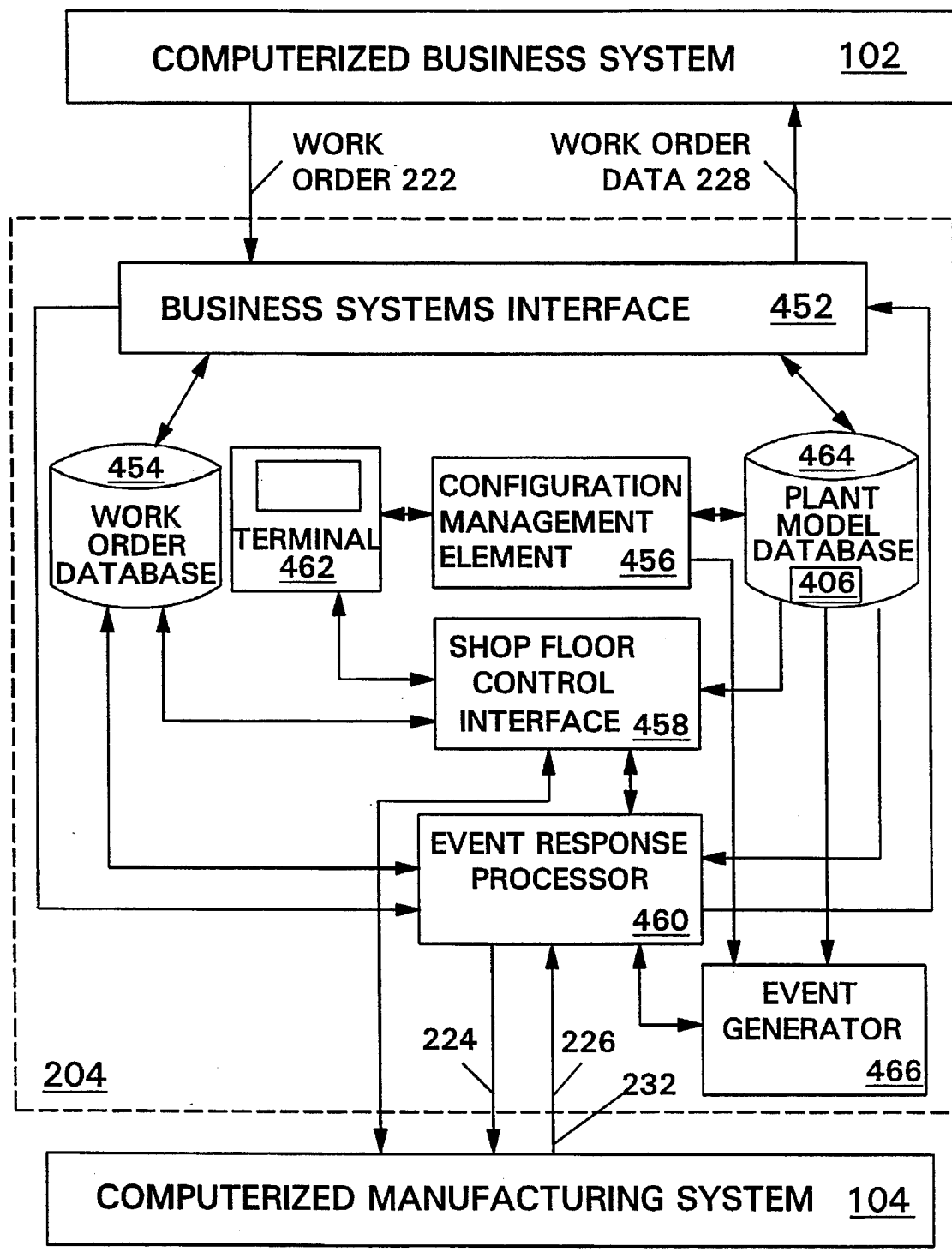
FIG. 4 is a block diagram illustrating fundamental components of the manufacturing execution system.

FIG. 4 is a block diagram illustrating an example implementation of manufacturing execution system 204. In this embodiment, manufacturing execution system 204 includes a business systems interface 452, a work order data base 454, an event response processor 460, a plant model data base 464, configuration management element 456, a shop floor control interface 458, and an event generator 466.

Although the architecture of the preferred embodiment described herein is discussed in terms of these distinct subsystems and data bases/tables as depicted in FIG. 4, it would be apparent to a person of skill in the relevant art how alternative architectures can be implemented to carry out the necessary functionality. For example, separate physical data bases can be combined into a single physical data base, separated logically.

The Overview section of this document describes the invention in terms of basic process steps. Referring to FIGS. 2, 3, and 4, this section provides a more detailed description of each step.

3.1 Business Systems Interface

In step 302, work order 222 is transmitted from computerized business system 102 and received by manufacturing execution system 204. The transmission can include work order information such as the product to be manufactured, the quantity to be manufactured, workcenters to be used to manufacture the product, the sequence in which the workcenters participate in a manufacturing process, raw materials to be used, the required quantities of the raw materials (reservations), and the like. Also the scheduled date for each operation and its planned duration can be included in the transmission. The work order 222 also includes scheduling data 234.

Data elements within a work order 222 are on two levels: a work order level and an operational level. On the work order 222 level, the data can include information such as company, plant, division, work order number, quantity planned for manufacture, store location, assigned lot number, lot quality status, and the like. Data elements on the operational level can also include client, company, plant, and work order identification number information. Additionally, data elements on the operation level can include information for the operation period. This information can include operation number, workcenter number, completion, status, start and stop times, setup times, machine times, labor time, and reservation/material usage information. The reservation/material usage information provides information needed by computerized business system 102 to maintain resource information. This information can include raw material identifiers, quantities reserved, unit of measure, store location taken from, lot number used, and the like.

Work order 222 can be transmitted as an unsolicited message to manufacturing execution system 204. Transmission can be scheduled by computerized business system 102. The frequency of work order 222 transmission varies based on the characteristics of the manufacturing cycle for the product.

Scheduling and sequencing of work orders 222 for the overall business enterprise (which may involve many geographically diverse manufacturing divisions, wherein each division might contain between one and several hundred plants, and wherein each plant might contain between one and several hundred workcenters) on a large scope can be done within computerized business system 102. However, provisions for re-assigning work orders 222 are available within manufacturing execution system 204 to handle emergency situations such as the unavailability of computerized business system 102.

Step 302 also includes a transmission of master data 230 from computerized business system 102 to manufacturing execution system 204. The transmission of master data 230 can also be unsolicited with respect to manufacturing execution system 204 but usually occurs at a different time from the transmission of work order 222. Master data 230 is used by business interface 452 to update data in plant model database 464 so it is consistent with the current computerized business system 102 and the larger business environment. This function provides an automated update of data in plant model database 464 and ensures that manufacturing execution system 204 and computerized business system 102 use the same codes to reference the same items.

Master data 230 includes a materials master 236. Materials master 236 is used by manufacturing execution system 204 for maintenance of codes and for verification (discussed below). In one embodiment, materials master 236 is maintained by computerized business system 102.

In one embodiment, an initial transmission of master data 230 is manually invoked. Subsequent transmissions occur automatically. If manual input is required, manufacturing execution system 204 appropriately notifies the plant of such input requirements. For example, manufacturing execution system 204 requests manual input when it receives a code for an item for which it has no definition.

Figure 5:
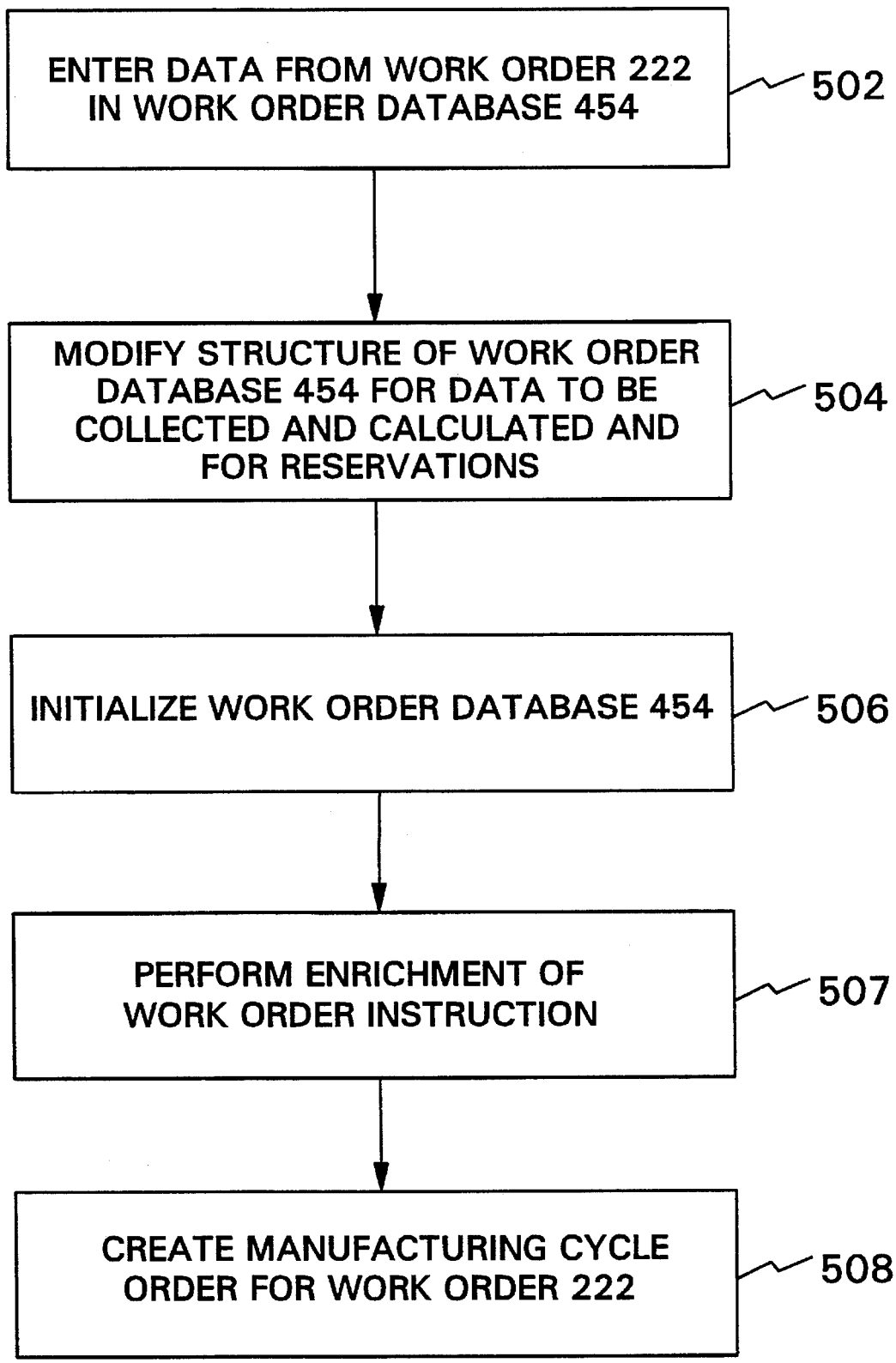
FIG. 5 is a flow chart illustrating the work order management process executed by the manufacturing execution system in response to a received work order.

In step 304, work order 222 is used by business systems interface 452 to update data in work order database 454 so that work order database 454 represents the work scheduled. The manner in which work order database 454 is updated in one embodiment is illustrated in FIG. 5. Referring now to FIGS. 4 and 5, in a step 502, data included in work order 222 is entered into workorder database 454 as a work order instruction. This data includes reservation information which specifies the raw materials required to manufacture the product specified by work order 222. The data in work order 222 also includes the manufacturing operation(s) to be performed in order to manufacture the product, the workcenter(s) on which those operation(s) are to be performed, and the target dates and times for the manufacturing operation(s), and target dates and times for completion of the finished product.

In step 504, the size of work order database 454 is modified to hold at least one additional field for data to be collected and/or calculated during manufacturing operations in accordance with the work order 222.

In step 506, work order database 454 is initialized to hold additional data from plant model database 464 that relates to the work order instruction derived from work order 222. The initialization also insures that the work order instruction in work order database 454 conforms to data definitions defined in plant model database 464. During the initialization of work order database 454, data derived from the work order instruction and acquired from plant model database 464 is stored into the fields created in step 504.

In a step 507, an enrichment of the work order instruction is performed using data from plant model data base 464. This provides enrichment data essential to manufacturing operations. This enrichment data is used to further update work order database 454.

In step 508, the reservation information now contained in the work order instruction is used to create a manufacturing cycle order. One manufacturing cycle order is created for each manufacturing operation.

A manufacturing cycle order relates to a manufacturing cycle scheduled to run on a certain workcenter (manufacturing unit, e.g., extruder) at a certain time to fulfill an operation scheduled by computerized business system 102 (i.e., to fill work order 222). Initially, every scheduled operation is reflected by one manufacturing cycle order. If necessary, the manufacturing execution system 204 may create additional manufacturing cycle orders for the operation which, after being executed, is reported to computerized business system 102 (e.g., for the case of an extruder as described above). Additionally, manufacturing cycle orders may be dynamically created (e.g. in the case of a series of reactor manufacturing cycles as described later in this specification).

A manufacturing cycle order also includes manufacturing cycle order target data. Manufacturing cycle order target data specifies an amount of finished or intermediate product to be manufactured according to a manufacturing cycle order together with other necessary information (e.g., machine time) to be used in at least one manufacturing cycle.

At this stage, reasonability checks are performed to determine whether all materials, workcenters, units of measure, and like attributes referred to in work order 222 are defined in manufacturing execution system 204. In one embodiment, if an item referred to in work order 222 is not defined or is inconsistent with a current definition in manufacturing execution system 204, work order database 454 is still modified in response to work order 222, but a flag is entered into work order database 454 indicating operator intervention is required. Shop floor control interface 458 subsequently utilizes the flag to ask the operator to validate the data in work order database 454 and to correct the discrepancy by either correcting the data in work order database 454 resulting from work order 222, or by updating plant model database 464 to include a new definition for the item.

The human interface to shop floor control interface 458 is provided by an operator terminal 462. Updates to plant model database 464 are accomplished through configuration management element 456. Updates to work order database 454 are accomplished through shop floor control interface 458.

Additionally, data in work order database 454 resulting from work order 222 can be updated, canceled, or copied by event response processor 460. These data operations can be in response to an event from computerized manufacturing system 104 (via event response processor 460) or a message from computerized business system 102 (via business systems interface 452).

If work order 222 includes a command indicating that no more transactions will be accepted by computerized business system 102 for that work order 222, then business interface system 452 notifies event response processor 460 of this. In response, event response processor 460 modifies work order database 454 to mark data related to work order 222 for subsequent purging.

3.2 Optional Enrichments and Setpoint Computation

In a step 306, shop floor control interface 458 and event response processor 460 perform optional enrichments of the manufacturing cycle order where required. These optional enrichments can be acquired from manual data inputs, external data sources, table look-ups, or automatic data retrieval from computerized manufacturing system 104.

For manual input of enrichment data, an operator enters the data on terminal 462. The data are compared to plant model database 464 to ensure the data types and/or definitions are appropriate. If so, the data are then stored in the proper fields in work order database 454.

If the data source for the enrichment data is external to the manufacturing execution system 204, event response processor 460 queries plant model data base 464 to determine the source of the data within computerized manufacturing system 104, then retrieves the data from the designated source. The data are then used to update work order database 454. External data sources in the computerized manufacturing system 104 can include laboratory information management systems (LIMS) or other such auxiliary systems involved in monitoring the manufacturing process.

For enrichment data to be obtained by table lookup, event response processor 460 looks up the enrichment data in data tables in plant model 464. This data is used to update the proper fields in work order database 454.

For automatic enrichment, data are obtained from computerized manufacturing system 104. Event response processor 460 retrieves this enrichment data from computerized manufacturing system 104 and then updates work order database 454 with this data.

In a step 308 event response processor 460 generates setpoints 224 to carry out at least a part of the task specified by work order 222. Setpoints 224 are generated at various times in response to inputs from shop floor control interface 458, inputs from business systems interface 452, inputs from computerized manufacturing system 104, and/or inputs from event generator 466.

Associated with setpoints 224 are comments for use by the human operator in carrying out the manufacturing process specified by the setpoints 224. These comments, resident in work order database 454, can be accessed by operators via shop control interface 458 (via terminal 462).

Manufacturing execution system 204 fully manages the generation of setpoints 224. This interface eliminates the need for shop floor control operators to interface directly with computerized business system 102. Alternative embodiments may be considered wherein human operators can manage and monitor the execution of work orders 222 to varying degrees. Depending on the environment or the desired implementation, human operators can be asked to monitor the execution, supply required parameters, approve the performance of steps in the execution, and perform other manual operations. Such human intervention may be desirable to meet safety or security requirements, for example.

The setpoint 224 computations are defined in plant model database 464 to meet specific process control requirements. Setpoints 224 are generated using information in work order database 454 and plant model database 464.

During the setpoint computing process, the event response processor 460 performs reasonability checks on the input and the calculated data. If any data fail a reasonability check, they are flagged and the operator is notified of the problem through shop floor control interface 458 so that appropriate action (validation or adjustment) can be taken. Once the setpoints 224 have been successfully computed, they can be provided to computerized manufacturing system 104 as noted by step 310.

Once generation of setpoints 224 is initiated, manufacturing execution system 204 monitors the status of specific work orders and specific workcenters and provides summary status information to operators via status displays on terminal 462. Status displays include a display of information such as the amount of product manufactured at a given time and the units of manufacture (e.g., in pounds, kilograms, gallons).

If a problem or a need for validation occurs, status information is displayed by the shop floor control interface 458 on the terminal 462 so the operator can take corrective action. Problems may be determined by direct notification from computerized manufacturing system 104 or in response to reasonability checks on data received from computerized manufacturing system 104.

A guidance system within shop floor control interface 458 allows an operator to identify any outstanding problems via terminal 462. For each problem, the guidance system identifies an operator or category of operator (technician) capable of fixing the problem. An operator can use terminal 462 to view a listing of the items identified by the guidance system. The guidance system provides menu driven screen displays to allow the operator to scroll through the list of problems. In some cases, the screens allow the operator to select additional screens that outline an approach to solving the problem.

3.3 Configuration Management Element

Terminal 462 and configuration management element 456 provide means for a human to define and modify data for the plant and to configure plant model database 464 to meet that particular plant's requirements. Plant model database 464 includes at least one table that identifies all data relationships relevant to the execution of a manufacturing operation. This is used to achieve compatibility between the computerized business system 102, manufacturing execution system 204, and computerized manufacturing system 104.

Work order data base 454 contains, at any point in time following the receipt of at least one work order 222, at least one instance of plant model database 464 to steer manufacturing operations on workcenters and associated use of the manufacturing execution system 204 to handle related work orders 222. Because plant model database 464 can be tailored to each particular plant's requirements, manufacturing execution system 204 can be easily modified to operate in a variety of manufacturing environments.

Configuration management element 456 is the input means for defining data for the plant model database 464 residing in manufacturing execution system 204. The plant model database 464 facilitates a mapping of data between computerized business system 102 and computerized manufacturing system 104. As a result, the computerized business system 102, computerized manufacturing system 104, and manufacturing execution system 204 can operate in concert with one another since their respective data schemes have plant model database 464 as a common reference.

To simplify this mapping, a generic plant model 406 is implemented in plant model database 464. Generic plant model 406 is a common medium to which specific plant elements can be mapped. Generic plant model 406 is discussed in detail below in Section 7 of this document.

3.4 Interface to the Manufacturing Environment

In step 310, setpoints 224 are provided to the appropriate process control system 110 within computerized manufacturing system 104. Manufacturing execution system 204 provides the ability to print setpoints 224, and to electronically transmit setpoints 224 to process control system 110 within computerized manufacturing system 104. This electronic transmission can be done following computation of setpoints 224 in response to receipt of an event by event response processor 460 from computerized manufacturing system 104, event generator 466, or manually in response to a command entered by an operator through terminal 462 and the shop floor control interface 458.

When computerized manufacturing systems 104 receive setpoints 224, the manufacturing operation(s) can commence.

In a step 312, event response processor 460 collects data in response to process events 232 from computerized manufacturing system 104 or other events from either the event generator 466 or the shop floor control interface 458. In this step, various data points required to satisfy computerized business system 102 and other business environment transaction requirements are collected in response to events. Data collected includes data concerning manufacturing operations which have executed in response to work order 222; also collected are any manufacturing data 226 related to plant requirements regarding batch and/or continuous accounting.

In one embodiment, this data collection process is primarily driven by plant defined events from process control system 110 (such as completion of a lot), and specific clock events from event generator 466. However, the events can include events from business system interface 452 or human operator initiated events from the shop floor control interface 458. When an event occurs, manufacturing execution system 204 initiates the collection of all data associated with a particular event as defined by the plant in plant model database 464.

Manufacturing execution system 204 can collect data from multiple data sources. These sources include control data via process information system 108, manual data entry, and data transmitted from computerized business system 102 used to automatically fill in business information. The data collected from these sources is integrated (combined) to form a comprehensive data base. This data base could comprise a single data base or a set of related data bases.

Manufacturing execution system 204 can also optionally use event generator 466 and event response processor 460 to meter data over time (in the context of an estimate relating to the area under a curve) from process control system 110. This allows the plants to define metering calculations of processed data without having to use process control system 110 resources to perform these calculations. In alternative embodiments, the metering calculations could be performed in process control system 110 or in process information system 108.

Figure 8:
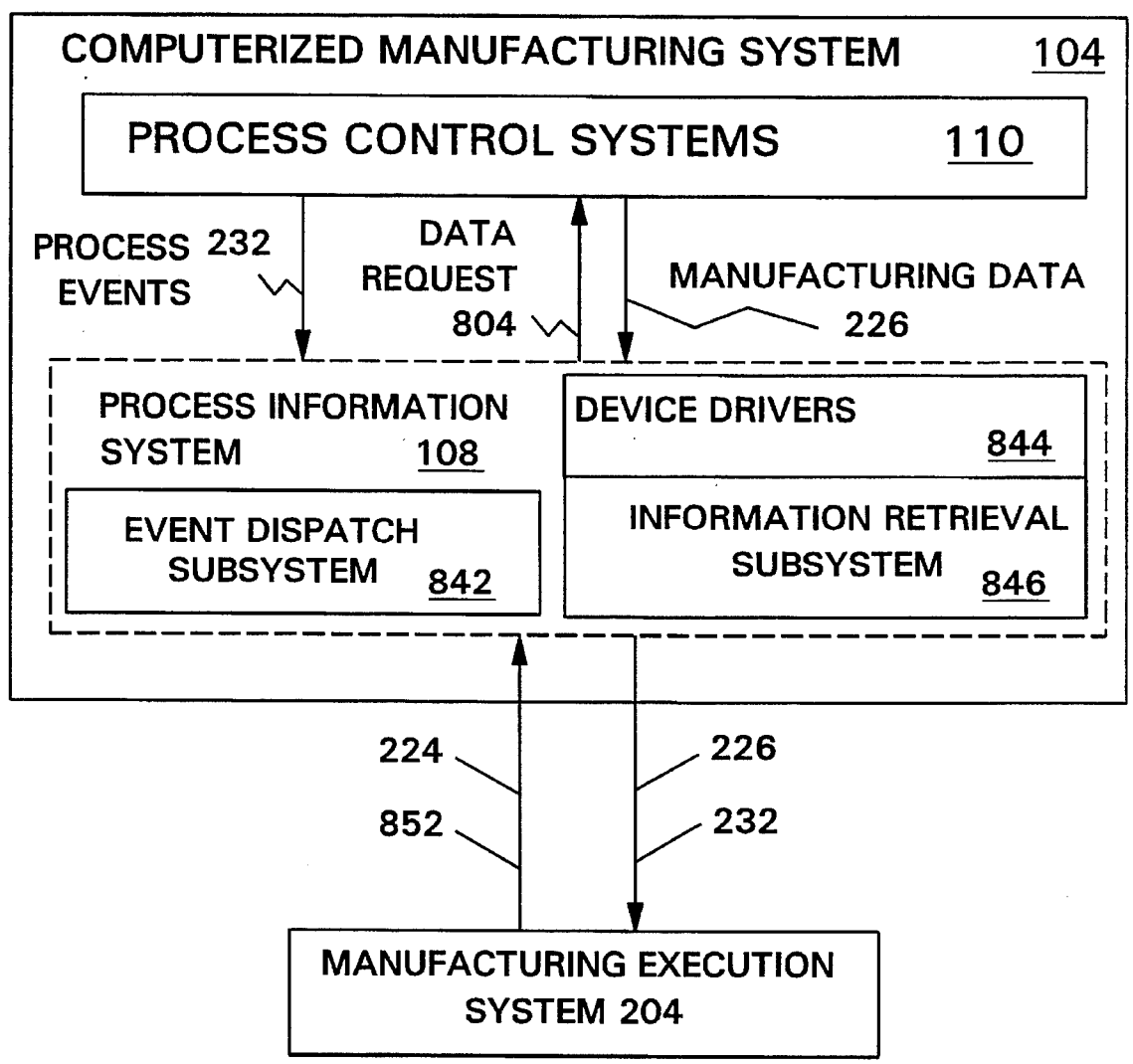
FIG. 8 is a block diagram illustrating event handling and communication between different types of process control systems and the manufacturing execution system according to the present invention.

In one embodiment, the interface to computerized manufacturing system 104 is handled using process information system 108 as depicted in FIG. 8. Manufacturing execution system uses process information system 108 to communicate with specific workcenters in computerized manufacturing system 104. Process information system 108 has two subsystems to perform the interfacing function. These are an event dispatch subsystem 842 and an information retrieval subsystem 846.

Event dispatch subsystem 842 is used by manufacturing execution system 204 to monitor events and to forward events to event response processor 460 which then implements actions based on the events. The information retrieval subsystem 846 retrieves information for manufacturing execution system 204 from process control system 110 for specific workcenters. Alternative embodiments may be considered wherein manufacturing execution system 204 interfaces directly with process control systems 110 without process information system 108.

3.5 Data Management and Reporting

In step 314, manufacturing data 226 received in step 312 is manipulated by event response processor 460. This manipulation includes integration of collected data over time, calculations using collected data and data storage. The specific operations to be performed are defined in plant model database 464 which can be tailored to meet plant-specific orders.

Manufacturing execution system 204 can collect and organize data by either batches (batch accounting) or by periods of time such as hours or days (continuous accounting). These two methods of collecting and organizing data are quite different. Batch accounting collects data associated with a particular batch along with additional attributes describing the collective data. Continuous accounting collects and summarizes data over specified periods of time. For example, continuous accounting may collect and summarize information regarding the amount of steam used by a plant on a particular day or week. The continuous accounting aspect of manufacturing execution system 204 can be implemented in a straightforward manner.

In one embodiment, it is essentially a time-based accounting system that collects data for predetermined periods of time. The continuous accounting system cannot generally collect or apply additional attributes to this data in the way that batch accounting can. For example, if a plant wants to record extruder production by the day, the continuous accounting function captures the amount of product manufactured in that time period. Continuous accounting does not differentiate among various specific products made in a batch plant environment. The batch accounting function, on the other hand, collects the lot-specific data.

The concepts of batch and continuous accounting are described in detail in Section 10 of this patent document.

3.6 Data Transfers to the Business Environment

In step 316, business systems interface 452 sends work order data 228 to computerized business system 102. Work order data 228 is a result of data collected in step 312 and manipulated in step 314.

Manufacturing execution system 204 provides the functionality to allow the plant to define data reasonability checks to be performed on the data before it is sent to computerized business system 102. The reasonability checks perform tests to determine whether the data falls within certain reasonable limits and is correct in relation to other data. If the data fails a reasonability check, the plant will be required to validate the data and take corrective action (e.g., adjustments) if necessary.

The transactions identified for transmission to computerized business system 102 are queued for transmission by business systems interface 452 (described in greater detail below). This insures that all data is successfully delivered in proper sequence. Error conditions encountered by computerized business system 102 are reported to manufacturing execution system 204 for correction by the plant. In one embodiment, any related transactions following an error are held for processing until they have been retransmitted with the transaction error corrected.

Manufacturing data 226 collected by manufacturing execution system 204 relate to work orders 222. Manufacturing data 226 can include several types of information such as: materials manufactured, raw materials used, machine time, setup time, receipts, shipments, and stock adjustments. In one embodiment, manufacturing data 226 includes all solicited data requested by manufacturing execution system 204 from computerized manufacturing system 104 (as opposed to events which are not solicited by the manufacturing execution system 204). This data can be acquired to characterize the status of an executing manufacturing cycle order, or to characterize the status of work order 222. This is possible because some data related to work order 222 may be maintained within computerized manufacturing system 104 instead of manufacturing execution system 204. The manner in which a work order 222 is translated into at least one manufacturing cycle order can vary as a function of the manner in which computerized business system 102 is interacting with manufacturing execution system 204.

Examples of basic business transactions are: the booking of a finished product into inventory, an adjustment of inventory for raw materials consumption, and completion confirmations for a manufacturing cycle operation.

4. Manufacturing Cycle Orders

When work order 222 is sent from computerized business system 102, it includes information specifying certain manufacturing details. Such details can include the finished product to be manufactured, the manufacturing time estimated to complete the finished product, information regarding manufacturing operations to be performed in manufacturing the product (which is not resident in the computerized manufacturing system database and which executes manufacturing control decisions on the workcenters manufacturing the product), any special instructions from the scheduling function in the computerized business system 102 (which could include a textual field for reference by a human), and reservations that computerized business system 102 has made for raw materials required to manufacture the finished product. Reservations allow future inventories of raw materials to be estimated.

Some of the information in the work order 222 is considered to be work order target data as it defines computerized business system's 102 expectation of what manufacturing data 226 will be generated in the manufacturing operations. The work order 222 and the associated work order target data are articulated within the context of the data structures of computerized business system 102.

Manufacturing execution system 204 creates manufacturing cycle orders from work order 222. Manufacturing cycle orders facilitate the conversion of the needs indicated in the work order 222 into the context of the data structures of the particular computerized manufacturing system 104.

These manufacturing cycle orders contain manufacturing cycle order target data derived from the work order target data. In the same regard as work order target data define an expectation from computerized business system 102 to manufacturing execution system 204, manufacturing cycle order target data are considered to be an expectation of manufacturing execution system 204 as to the manufacturing data 226 to be generated in manufacturing operations.

Manufacturing data 226 is generated during manufacturing operations to manufacture the finished product to fulfill work order 222. Manufacturing data 226 is the actual data which can then be compared, overwritten, and/or related to the manufacturing cycle order target data, or to its parent work order target data. Manufacturing data 226 is, therefore, data generated during the actual manufacturing cycle (as opposed to planned data) relating to raw materials used, finished product manufactured, and special activities.

In further regard to the conversion of work order target data contained in work order 222 into manufacturing cycle order target data, the terms used within the computerized business system 102, the manufacturing execution system 204, and the computerized manufacturing system 104 can be different. Reasons for this difference can be related to geographic differences, local material coding variances, or acceptable chemical equivalencies. However, the manufacturing systems need to be able to determine the correct substance regardless of the term used. Because it is desirable to define some terms in a generic sense (for ease of reuse), a material mapping functionality is provided to allow terms to be mapped among computerized business system 102, manufacturing execution system 204, and computerized manufacturing system 104.

To this end, the use of three coding identifiers for a substance is desirable: one for the computerized business system 102, one to facilitate generic coding efficiency, and one for computerized manufacturing system 104. This provides a straightforward material mapping functionality within the manufacturing execution system 204.

For example, "sugar" in the context of the computerized manufacturing system 104 might be mapped into the term "sweetener" in the manufacturing execution system 204 to produce a soft drink. The "sweetener" might then be mapped into "brown sugar" for one manufacturing cycle related to one workcenter and into "aspartame" for a second manufacturing cycle related to a second workcenter.

Note in this example that "sugar" might be resident in computerized business system 102 as a result of contracts which occurred many years prior to the development of modern artificial sweeteners. Manufacturing execution system 204 uses the more generically proper term "sweeteners" to enable the interpretative functionality between the business environment and the more precise species of sweetener defined for the example in the computerized manufacturing system 104.

Material mapping is therefore a species-to-genus-to-species functionality which helps to enable the harmonization between the computerized business world and the computerized manufacturing world to enable computer integrated manufacturing.

One (or a first) manufacturing cycle order is created by manufacturing execution system 204 when a work order 222 is received. A manufacturing cycle order defines a manufacturing run on a workcenter. For example, the manufacturing cycle order may be one reactor load. For plants using computerized business system 102, the receipt of work orders 222 by manufacturing execution system 204 results in the creation of one manufacturing cycle order. This manufacturing cycle order may be duplicated (if several runs are needed) by the manufacturing execution system 204 after the completion of the manufacturing cycle related to that first manufacturing cycle order if the needs of work order 222 have not been fulfilled by the first manufacturing cycle.

In some cases, a second manufacturing cycle order may not be necessary. One manufacturing cycle order for one work order 222 is effective for manufacturing certain products on certain types of workcenters. In this regard, a comparison of a reactor workcenter and an extruder workcenter is used as an example to illustrate the different manner in which a manufacturing cycle order might be used to initiate and monitor the manufacturing cycle.

An extruder is a machine that operates with a series of steps in its manufacturing cycle but has the capacity for a very extended steady state run step. When an extruder receives a manufacturing cycle order for 100,000 pounds of material, it can relate to this single manufacturing cycle order for configuration purposes and remain in the steady state manufacturing step until 100,000 pounds are manufactured.

However, unlike an extruder, a batch kettle reactor can only manufacture a limited quantity of product because the reactor has a fixed size. With respect to the present example, five reactor batches of 20,000 pounds each may be needed to fill the 100,000 pound order. In this situation, setpoints 224 are created for one manufacturing cycle order of 20,000 pounds, and transmitted to the reactor's process control system 110 to make a first batch. The process control system 110 manages the manufacturing cycle for the first batch, increments a manufacturing cycle order counter and sends an event to manufacturing execution system 204 indicating the completion of the first batch. In response to that event, manufacturing execution system 204 creates a second manufacturing cycle order, but does not transmit setpoints 224 again because they are the same as in the first manufacturing cycle. Note, however that an optional "handshake" acknowledgement communication might be transmitted if the computerized manufacturing system 104 requires such an indicator prior to initiation of the next manufacturing cycle. The second manufacturing cycle order is used to relate to the manufacturing operations of the second manufactured batch related to the original work order 222.

Another scenario using 5 batch kettle reactors could occur wherein 5 manufacturing cycle orders (one per reactor) are generated by the manufacturing execution system 204 in response to the work order 222 to manufacture 100,000 pounds in one manufacturing cycle executing in five 20,000 pound workcenters. In this case, the manufacturing execution system 204 waits until the 5 separate manufacturing cycles are accounted for prior to generating a directive to manufacture a possibly needed 6th batch (of perhaps less quantity than a normal batch where the quantity is determined as the difference between 100,000 pounds and the actual material manufactured by the 5 batches already implemented).

A more complex scenario results from the situation where a work order 222 is received for a material which is manufactured in two stages: a first stage requiring the use of a group of batch kettle reactors to make an intermediate product, and a second stage to process the intermediate product through an extruder. The manufacturing execution system 204 first creates the manufacturing cycle orders for the kettle operation; after confirmation events have been received indicating that the necessary amount of intermediate product has been manufactured by the kettle reactors, a manufacturing cycle order is generated to interact with the extruder as it processes the intermediate product into the final product.

In one embodiment, manufacturing execution system 204 can generate a manufacturing cycle order based upon an unsolicited process event 232. In this embodiment, manufacturing execution system 204 can be used as a companion to a computerized manufacturing system 104 without a secondary electronic link to a computerized business system 102. Some examples of this situation are a manufacturing system which is isolated from a global network, a manufacturing system in test mode, or perhaps a manufacturing system undergoing a substantial redesign with respect to its "relationship" with the computerized business system 102. These manufacturing system cases can still use the manufacturing execution system 204 for purposes of report generation, local cycle management, and human operator information. For plant environments not using computerized business system 102, manufacturing cycle orders are created upon receipt of an event from computerized manufacturing system 104 indicating the start of a process or as a result of input from the terminal 462. The information contained in an event from computerized manufacturing system 104 is sufficiently comprehensive in this regard to define the type of manufacturing cycle order needed to handle the manufacturing cycle being initiated. In this environment, manufacturing cycle orders do not contain scheduling information from computerized business system 102.

5. Manufacturing Execution System Data Flow

Figure 9:
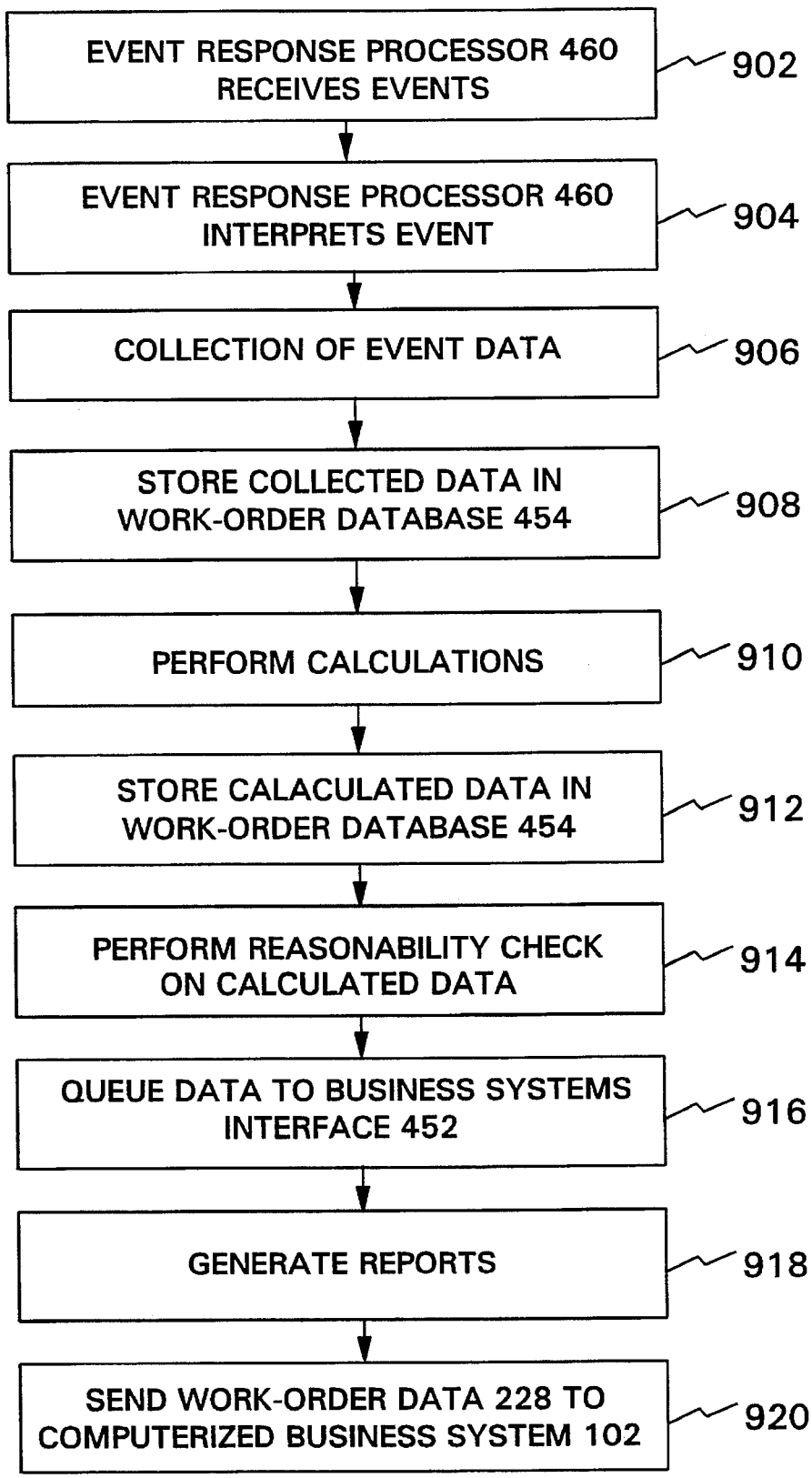
FIG. 9 is a flow chart illustrating steps in manufacturing data management associated with event handling.

One data exchange method for data transmission between process control system 110 and manufacturing execution system 204 using process information system 108 is illustrated in the block diagram of FIG. 8. FIG. 9 is a flow chart illustrating steps involved with the preferred data exchange approach. With reference to FIG. 4, 8, and 9, the accompanying discussion is framed in accordance with the preferred embodiment that includes a separate process information system 108. It would be obvious to a person skilled in the relevant art how other embodiments may be implemented without a separate process information system 108 or with the functionality described as being performed by process information system 108 delegated in whole or in part to process control system 110 and/or manufacturing execution system 204.

Referring now to FIGS. 4, 8, and 9, process control system 110 generates process events 232 based on manufacturing operations in the workcenters. Process events 232, which indicate manufacturing milestones such as manufacturing cycle start and stop occurrences, are received by event response processor 460 in a step 902. Note that events from event generator 466 can also be received by event response processor 460, and event response processor 460 may define events into event generator 466 in response to process event 232 received from computerized manufacturing system 104. Also note, events from or the shop floor control interface 458 can be received as well.

Event generator 466 functions as a virtual timer to facilitate time delay operations in the present invention. Its functionality is analogous to setting an egg timer. A timer initiating event occurs when a first manufacturing event (an egg being dropped into boiling water) is performed and a second timer response event (a bell rings three minutes later) occurs to signal the end of the manufacturing process.

The above events from computerized manufacturing system 104, event generator 466, and shop floor control interface 458 trigger manufacturing execution system 204 to retrieve manufacturing data 226. Process events 232 can be start and stop occurrences further containing a unique identifier indicating which workcenter originated the event. In one embodiment, process events 232 include information indicating whether the event is targeted for manufacturing execution system 204.

Event dispatch subsystem 842 receives process events 232 from process control system 110 targeted for manufacturing execution system 204. These process events 232 are queued and communicated to manufacturing execution system 204 by event dispatch subsystem 842. Event response processor 460 receives these process events 232 in a step 902.

Event dispatch subsystem 842 also performs data level reconciliations necessary to accommodate multiple interactive formats which may be required to support different types of process control systems 110.

In a step 904, event response processor 460 interprets the event received (e.g. process event 232) to determine the source system in computerized manufacturing system 104, the type of event being communicated, the appropriate identifier to relate to the relevant generic workcenter, and the relevant data store in work order database 454. Event processor 460 can now take action based on the received event as further described below.

Figure 7:
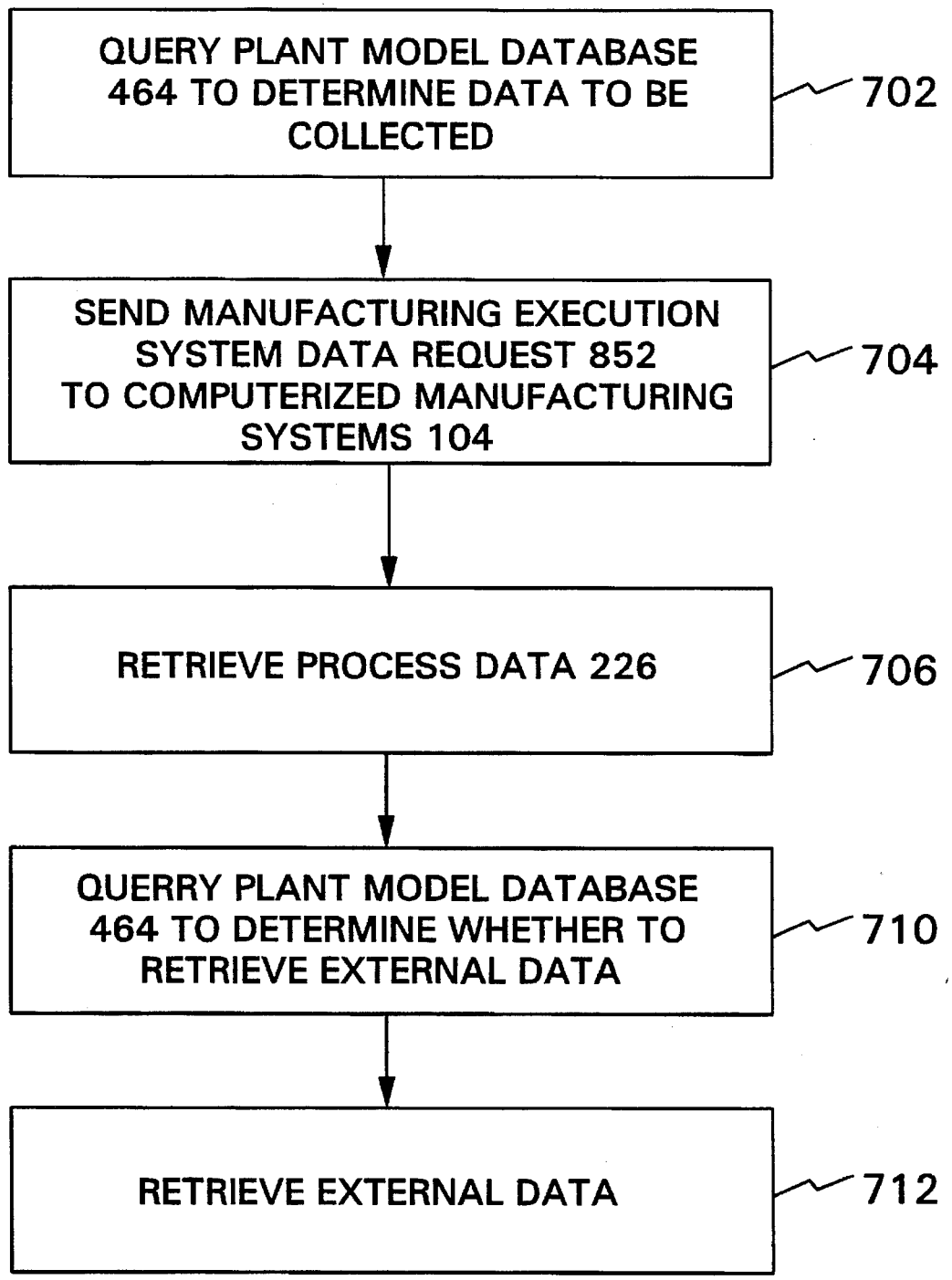
FIG. 7 is a flow chart illustrating data retrieval by the manufacturing execution system in response to an event.

In a step 906, event response processor 460 optionally collects data to be collected for the event received. The process of collecting this data is illustrated in, and described with reference to FIG. 7. Referring now to FIGS. 7 and 8 when a process event is received by event response processor 460, event response processor 460 queries plant model database 464 to determine what data is to be collected for the event received and the location from which the data is to be collected. This occurs in a step 702. If no data needs to be collected in response to the event, this is also indicated.

In a step 704, event response processor 460 sends a manufacturing execution system data request 852 to computerized manufacturing system 104. In one embodiment, manufacturing execution system data request 852 is first communicated to information retrieval subsystem 846 in process information system 108 where data transport reconciliations are facilitated in conjunction with device driver 844. Information retrieval subsystem 846, in conjunction with device driver 844, prepares a data request 804 to request manufacturing data 226 from process control systems 110.

Data request 804 is then transmitted to process control system 110. In this step 704, event response processor 460 is virtually requesting the data which plant model database 464 indicated was to be collected.

As discussed above, process information system 108 is used as an interface to process control systems 110. Process information system 108 provides the capability to interface to multiple process control systems 110, each having different interface characteristics. For each interface type, a device driver 844 is provided. Device driver 844 provides the interface necessary to communicate in spite of unique characteristics of a process control system 110.

The retrieval is performed through the use of information retrieval subsystem 846 in a step 706. Information retrieval subsystem 846 retrieves and sends manufacturing data 226 to manufacturing execution system 204. There can be multiple data paths for sending multiple streams of manufacturing data 226 simultaneously. Manufacturing data 226 can include any type of data that can be electronically represented such as material identifiers, store locations, lot numbers, and process variables such as operating temperatures, pressures, and the like).

In a step 710, event response processor 460 queries plant model database 464 to determine whether any external data from other systems must be retrieved in response to the event received in step 902 (FIG. 9).

In a step 712, if external data is to be received, event response processor 460 retrieves such data. This external data can include either manual input data entered by plant operations personnel via a terminal 462, or LIMS (laboratory information management system) quality related data.

Returning again to FIGS. 4, 8, and 9, in a step 908, the data collected in step 906 is stored in work order database 454. Collected data can also have a reasonability check.

In a step 910, once all the manufacturing data 226 received by manufacturing execution system 204, calculations can be performed. To perform these calculations, event response processor 460 first queries plant model database 464 to determine what calculations are to be performed for the event. Data in plant model database 464 includes information pertaining to calculations to be performed, data to be used in those calculations, data units and default values, and the like information. Event response processor 460 performs the necessary calculations based on the information contained in plant model database 464.

Because plant model database 464 provides event response processor 460 with all the necessary event information such as what data to be collected, where to collect the data, and what calculations are to be performed on the collected data, manufacturing execution system 204 can be readily implemented in a variety of environments and interfaced to numerous different types of computer manufacturing systems 104. To implement manufacturing execution system 204 in a different environment, all that has to be changed is the information in plant model database 464. More specifically the events to be received must be defined, the data to be collected upon receipt of such events must be defined along with the data sources, and the calculations to be performed on that data must be defined. By tailoring these types of information contained in plant model database 464, manufacturing execution system 204 can be tailored to suit the needs of numerous plant environments.

Preferably, each variable calculated has a calculation statement as well as an optional reasonability check statement. Examples of calculations performed in step 910 include yield, energy, or consumption of raw materials used by several different workcenters in different process control systems 110.

Additionally, conditional calculations may be performed to adjust variables used in different workcenters. For example, some latex lot tanks may store data in units of pounds while other lot tanks store the data in units of gallons. Thus a calculation is performed to adjust the units factor as a condition of which workcenter is involved.

In a step 912, data calculated in a step 910 is stored in work-order data base 454.

In a step 914, event response processor 460 performs a reasonability check on the data calculated. This reasonability check is performed based on rules and information contained in plant model database 464. Examples of a include a reasonability check to determine whether the data is within a defined range. Optionally, step 914 can include validation by a human via terminal 462 and shop floor control interface 458.

In a step 916, event response processor 460 identifies all data to be sent to computerized business system 102 and queues this data to business systems interface 452. The data to be sent to computerized business system 102 is identified based on information contained in plant model database 464.

In a step 918, reports are generated by manufacturing execution system 204. For each event, standard or customized reports can be generated and stored in plant model database 464. The report can be selected upon request of the user or can be generated automatically.

Manufacturing execution system 204 can optionally notify other applications of process event 232 or other events. This enables an application external to manufacturing execution system 204 to perform a function in indirect response to a process event 232 received by manufacturing execution system 204. In other words, manufacturing execution system 204 can function as a coordinating interface for initiating operations on a number of systems in response to a process event 232. This feature simplifies the programming challenge within computerized manufacturing system 104 since the individual units within computerized manufacturing system 104 can use manufacturing execution system 204 as a reference point for event notification. This reduces the amount of data space and computer time required of computerized manufacturing system 104 system for interaction with external systems.

For example, a label printer can be initiated to produce labels for a finished product after manufacturing execution system 204 has received a process event 232 indicating completion of a manufacturing cycle. This scenario is preferable requiring computerized manufacturing system 104 to initiate the label operation independently. This scenario is preferable where data space and computer time within process control system 110 are much more time-critical than in manufacturing execution system 204.

In a step 920, business systems interface 452 sends work order data 228 to computerized business system 102. This can be initiated by any of several means. Business systems interface 452 may send queued data on a periodic basis or in response to a request from event response processor 460. Business systems interface 452 may receive a confirmation of receipt from computerized business system 102 and may receive error messages from computerized business system 102.

6. Scheduling

Scheduling refers to the process by which a group of goals to be achieved are arranged within the context of an agenda or timetable. Regarding a workcenter being implemented within the context of the use of a process control system 110, each manufacturing cycle, related to by the manufacturing execution system 204 as a manufacturing cycle order, is directed to the goal of manufacturing a finished product which has value to the overall business enterprise. A manufacturing cycle usually requires time for implementation. Workcenters can be optionally configured to manufacture a number of different products (as an example, in the chemical industry, polyglycols can be differentiated by their molecular weight, and molecular weight is frequently a function of the time during which a particular monomer is added to the reaction yielding the polyglycol—a single batch reactor system [workcenter apparatus component] can therefore manufacture a very large set of different polyglycol end products by varying the time of monomer addition). The timetable set up for a particular workcenter is therefore frequently an agenda of different future manufacturing cycles having different expected overall elapsed times necessary for their respective execution. The scheduling process is therefore directed to arranging a calendar for a workcenter which depicts a scenario of the order in which future manufacturing cycles will be implemented to fulfill the needs of the business organization. The calendar may need to be rearranged periodically by the computerized business system 102 to reflect issues related to marketing, purchasing, inventory control, or other executive level decisions. The calendar may also need to be rearranged at the division or plant level to reflect local issues such as unexpected maintenance, illness in the workforce, or issues related to raw material delivery to the local plant.

Computerized business system 102 performs a scheduling operation in conjunction with creation of work order 222. Manufacturing execution system 204 provides functionality to enable modification of a work center schedule. Scheduling in the context of manufacturing execution system 204 pertains to modifying scheduling data 234 as received with work order 222 to achieve flexibility needed in the manufacturing plant to respond to unexpected occurrences. Manufacturing execution system 204 provides a screen interface in terminal 462 for use by planning personnel to adjust the manufacturing schedule for a work center via shop floor control interface 458. In one embodiment, modifications of scheduling data are viewed as exceptions and are thus logged and accessible in exception reports. Manufacturing execution system 204 performs at least three scheduling functions related to schedule management: copying manufacturing cycle orders, modifying manufacturing cycle orders, and canceling manufacturing cycle orders.

6.1 Copying Manufacturing Cycle Orders

In one embodiment, every work order 222 transmitted from computerized business system 102 results in at least one manufacturing cycle order in manufacturing execution system 204. There may be cases where several manufacturing cycle orders are required to conduct manufacturing operations related to work order 222. In these cases, manufacturing execution system 204 copies a manufacturing cycle order as necessary. This may result for any of several reasons. First, processing in process control system 110 may require scheduling on a finer level than provided by computerized business system 102. For example, a plant with several identical reactors may be seen as one unit with a certain capacity in computerized business system 102, but the reactors are run individually in the plant by process control system 110. In this case, scheduling information received by manufacturing execution system 204 pertaining to this one large resource is adjusted to identify a particular one of the individual resources that make up the one resource recognized by the business environment.

Second, consider a manufacturing cycle order that has completed the manufacturing operation related to work order 222 but the product fails to meet quality specification, and thus another manufacturing cycle (or "run") is needed. If a plant wants to use the computerized business system 102 for job costing, the new run must be accounted for. This can easily be achieved by creating and executing a copy of the original manufacturing cycle order in manufacturing execution system 204. However, if this is done, the computerized business system 102 report must reflect combined data of the unacceptable product run and the new run.

Third, in the event of equipment breakdown, a manufacturing cycle order may be copied and modified to allow the product to be manufactured using an alternative workcenter.

Fourth, as discussed above, several reactor runs may be required to create a specific quantity of a product ordered. In this case, manufacturing execution system 204 dynamically creates additional manufacturing cycle orders so that the specified quantity of product is manufactured.

6.2 Modifying Manufacturing Cycle Orders

According to one embodiment, manufacturing execution system 204 can modify a manufacturing cycle order as long as its related manufacturing cycle in the computerized manufacturing system 104 has not started. Its target times (i.e., the time at which the manufacturing cycle in the process control system 110 of the computerized manufacturing system 104 should be initiated for the manufacture of the batch of product related to the manufacturing cycle order, and the time at which the manufacturing cycle should be completed for the manufacture of the batch related to the manufacturing cycle order) and the specific workcenter on which it is to be executed can be changed. If the workcenter assignment is modified, only a workcenter of the same type (i.e., from the same generic workcenter family) can be chosen. For example, a manufacturing cycle order designating a certain extruder can be assigned to another extruder but cannot be assigned to a blender. Other embodiments may be implemented providing varying degrees of flexibility of manufacturing cycle order modification.

6.3 Modifying Manufacturing Cycle Order Target Data

Manufacturing cycle order target data may be changed in certain circumstances. For example, when a raw material is missing and a substitute must be used, manufacturing cycle order target data is modified to facilitate this substitution. In one embodiment, this feature is reserved for emergency situations because this data may negatively influence the perception of the computerized business system 102 regarding balances of raw material reserved for use in the manufacturing process cycle. This feature should be invoked only upon operator request or after prompting for operator approval; use of alternative materials might further result in different quantities of a resource being used in different situations. Alternative embodiments allow manufacturing execution system 204 to automatically change manufacturing cycle order target data.

7. Generic Data Concept

Manufacturing execution system 204 handles large quantities of data which must be defined upon system implementation and throughout the life of the system. Whenever a new workcenter, material, or other resource is added to the system, additional data definitions must also be provided for that entity. Workcenters and setpoints 224 to control them, resources, enrichment definitions, actions, events, and the like are examples of required data definitions.

To reduce the amount of data that needs to be defined and maintained, manufacturing execution system 204 employs a generic data concept. The generic concept groups together similar objects having similar properties. For example, a set of workcenters which are used to manufacture a family of similar products frequently utilize similar apparatuses, similar materials and resources, similar setpoints 224, similar process control application programs in their process control system 110 and process information system 108, and similar training manuals for personnel.

The use of the generic data concept allows a single instance of the definitions of these attributes to be used for each specific workcenter within the group of generic workcenters. Since it usually requires time, effort, and space to construct any set of data and rules used in a manufacturing execution system 204, the use of this generic data concept substantially simplifies the task of constructing and maintaining the larger set of individual data and rules for each specific workcenter. Thus, the present invention enables the programming related to specific workcenters to proceed more efficiently by incorporating the use of generic definitions, which need to be defined only once, for classes of workcenter objects. Once the generic definitions have been articulated within the manufacturing execution system 204 for a class of workcenters, the further definitions for a specific workcenter object is limited only to those aspects which are unique to that workcenter.

The generic concept is not limited to defining generic workcenters. The generic concept extends to the definition of generic enrichments, generic setpoints, generic resources, generic accounting and process data, and the like. Generic enrichments are definitions of data needed for setpoint calculations on workcenters that belong to a generic workcenter group. For example, a setpoint calculation for the generic workcenter "extruders" may require melt flow rate as an input.

A generic plant model is used to implement this generic concept. The generic plant model is included within plant model database 464 and contains generic workcenter definitions and other generic definitions for the plant. Also, generic workcenter definitions and other generic definitions are stored in the generic plant model. Alternative embodiments may be considered wherein the generic plant model is a separate physical or logical database from plant model database 464 instead of being incorporated into plant model database 464.

The data structure for the generic plant model is illustrated in Table 1. At the highest level, the generic plant model is broken down into fields for generic workcenter, generic event types, and generic workcenter actions. Alternative structures may be implemented depending upon the requirements in which manufacturing execution system 204 is implemented.

TABLE 1

GENERIC PLANT MODEL

A. Generic Workcenter
  1. Generic Resource
    a. Reservations
    b. Enrichments
      i  Input Data Sources
      ii  Look-up Tables
    c. Setpoints
      i  Calculation Rules
      ii  Generic Output Tags
    d. Accounting & Process Data
      i  Computerized Business System Specifications
      ii  Generic Input Tags TABLE 1-continued

GENERIC PLANT MODEL iii  Calculation Rules
  2. Generic Report Definitions
B. Generic Event Type
  1. Manufacturing Cycle Status
  2. Manufacturing Cycle Status Transition Table
C. Generic Workcenter Action
  1. Generic Collection Lists
  2. Generic Computerized Business System Transactions
  3. Generic Action Report Lists Table 1 - A Generic Workcenter— As mentioned, the generic workcenter defines the characteristics of one or more specific workcenters that perform the same functions or have similar attributes. The definitions generically describe or define a collection of specific workcenters as a generic group without requiring specific references.

Table 1 - A.1

Generic Resources—Define a type of data element that is associated to a generic workcenter. The types of Generic Resources are reservations, enrichments, setpoints, and accounting and process data. Each generic resource is given a unique name (tag) that can be referenced in calculations, collections, lists, reports, and the like. Reasonability checks can also be included as attributes associated with each resource and reports.

Table 1 - A.1.a

Reservations—Represent the inventory quantities that have been reserved in the business system to satisfy work order 222. There is one reservation for each raw material that is expected to be used as well as a reservation for the amount of product to be manufactured.

Table 1 - A.1.b

Enrichments—Are supplemental data not included in work order 222 but required to properly compute setpoints. Enrichments can be derived via several methods including table look-up and input data from several sources. The generic plant model contains logical identifiers of the data that is to be retrieved for computing the setpoints.

Table 1 - A.1.b.i

Generic Input Tags—input from sources which can include manual input, computerized manufacturing system 104, and other external systems. Stored in the generic plant model 406 is a logical identifier for the input sources.

Table 1 - A.1.b.ii

Look-up Tables—based upon information in the material reservations.

Table 1 - A.1.c

Setpoints—Are data required by the computerized manufacturing system 104 to execute work order 222. Setpoints 224 are calculated from reservations and enrichments by applying calculation rules to data in work order database 454 in order to generate output data.

Table 1 - A.1.c.i

Calculation Rules—rules used to compute setpoints. These rules reference data values logically identified within generic plant model 406.

Table 1 - A.1.c.ii

Generic Output Tags—logical identifiers of data items that constitute the setpoints for a generic workcenter.

Table 1 - A.1.d

Accounting & Process Data—Are data that represent specific data elements relevant to a generic workcenter. Accounting data concern inventory changes and can include additional attributes defining resource (identifier code), store location, and lot number. Process data describe process related attributes such as temperatures, pressures, flow rates, and durations. Accounting and Process Data can be collected via multiple input sources or computed from other accounting and process data. Accounting and process data can be specified for transmission to computerized business system 102.

If a product is specified by computerized business system 102 and the identifier code for that product is not in the master data, an error is flagged to the operator via the guidance system in shop floor control interface 458 to initiate resolution of the problem. Through the use of the generic plant model, manufacturing execution system 204 has the ability to recognize new products (i.e., an identifier code does not exist in generic plant model for the product) and automatically create a new definition.

Table 1 - A.1.d.i

Computerized Business System 102 Specification— logical identification of what accounting and process data is to be transmitted to computerized business system 102.

Table 1 - A.1.d.ii

Input Data Sources—input from sources which can include manual input, computerized manufacturing system 104, and other external systems. Stored in the generic plant model 406 is a logical identifier for the input sources.

Table 1 - A.1.d.iii

Calculation Rules—rules used to compute accounting and process data. These rules reference data values logically identified within generic plant model 406.

Table 1 - A.2

Generic Report Definitions—Defines a report for a generic workcenter using the generic resources defined for the generic workcenter. The content and format of the report are determined by the definition. Generic report definitions can include template reports and definitions of report formats for a generic workcenter.

Table 1 - B

Generic Event Type—Logically identifies types of events that may occur on one or more generic workcenters (e.g., START and STOP events).

Table 1 - B.1

Manufacturing Cycle Status—Defines the valid status or states that a generic workcenter may have. (e.g., READY, RUNNING, STOPPED).

Table 1 - B.2

Manufacturing Cycle Status Transition Table—Defines the valid statuses that may exist when an event occurs and whether the status should be changed to a different status when a particular event occurs. The manufacturing cycle status transition table includes information such as predecessor relationships for events so that the receipt of an event in the correct sequence can be confirmed.

Table 1 - C

Generic Workcenter Action—logically identifies and defines the generic actions that must be executed when a particular generic event type occurs for a generic workcenter. Whenever a generic workcenter action is triggered, a predefined sequence of actions are executed. Actions include data collection, calculations, reasonability checks, transmissions, and report generations.

Table 1 - C.1

Generic Collection Lists—logically identifies and defines a list of generic resources for a generic workcenter action. The list comprises logical identifiers of the generic resources to be collected.

Table 1 - C.2

Generic Computerized Business System 102 Transactions— logically identifies and defines a list of transactions to be transmitted to computerized business system 102 for a particular generic workcenter action.

Table 1 - C.3

Generic Action Report Lists—logically identifies and defines a list of reports to be generated for a particular generic workcenter action.

8. Enrichment and Setpoint Calculations 8.1 Enrichment

Enrichment is a process of obtaining data that is required for setpoint or setpoint calculations but cannot be determined from manufacturing cycle order target data. Enrichment data is information required to perform a setpoint calculation that is not transmitted from computerized business system 102 as part of manufacturing cycle order target data. For example, the setpoint calculation might involve calculations that depend on the current melt flow rate for a material. This value cannot be taken from the manufacturing cycle order target data because the manufacturing cycle order target data only contains a list and quantities of materials that should be used or manufactured during the manufacturing cycle order run. The melt flow rate can be obtained either by data collection (e.g., from a workstation), table lookup, or other suitable means. Additional examples of enrichments include manufacturing constraints and finished product characteristics such as temperatures or dimensions, lab data on raw material properties, process data needed to supplement calculation inputs, and the like.

As discussed above, when work order 222 is received, information in work order database 454 is automatically expanded and translated to supply sufficient information to enable computerized manufacturing system 104 to execute the order specified by work order 222. This expansion includes mapping of computerized business system 102 codes into corresponding codes of manufacturing execution system 204 and identifiers of computerized manufacturing system 104. Additionally, work order 222 identifies a specific workcenter and its associated process control system 110 or manual operation workcenter.

The information contained in work order 222 is not sufficient in many cases to compute setpoints 224 required by computerized manufacturing system 104. This is because work order 222 comprises information pertaining to the product to manufacture, the materials to use in manufacturing, and the required quantities, but it does not include specific finished product characteristics such as product dimensions and product densities. Without this information, setpoints 224 cannot be computed and computerized manufacturing system 104 cannot manufacture the product ordered by work order 222. Therefore, business systems interface 452 "enriches" the basic work order 222 to include additional data derived from the transmitted data or current process or lab data. For example, if two finished products have the same raw material requirements but have different densities, a table lookup, indexed by finished product code, supplies the specific density for each product. Enrichment of work order 222 is described in greater detail below.

Sources of enrichments can include a product-specific lookup table, manual input, retrieval of process data or lab data, input from external programs, and the like. Data from a product-specific lookup table are retrieved when a work order 222 is transmitted. Manual input can be made anywhere between the transmission of work order 222 and the calculation of setpoints 224. Automatic retrieval occurs immediately before setpoint calculations, and input from external programs is retrieved immediately before setpoint calculations or anytime prior to setpoint calculations.

When a manufacturing cycle order is created or copied, an enrichment is performed. Enrichment definitions exist at the generic workcenter level. A set of generically identified enrichment data is inherited for each specific workcenter related to the generic workcenter. The generic enrichment definition contains a description of the data to be collected and its source. Enrichment data can be collected from a lookup table, automatically from computerized manufacturing system 104, from other external sources, or from manual input. The lookup table contains: (1) constants that depend on the resources occurring in either the manufacturing cycle order target data or the manufacturing cycle order (e.g., if resource A is used, temperature setpoint equals 80 degrees Centigrade); (2) finished product characteristics; (3) work center characteristics; and/or (4) combinations of product and workcenter related attributes.

Figure 11:
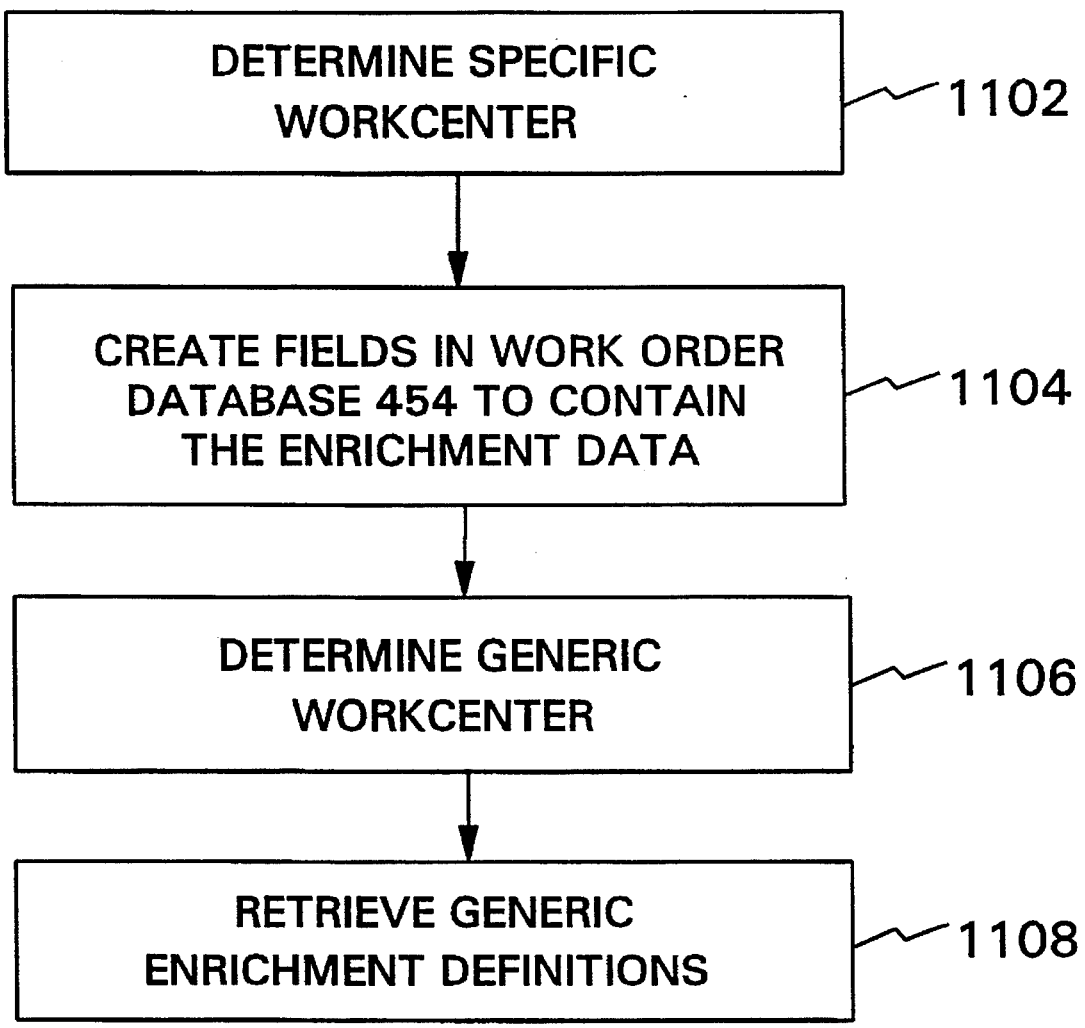
FIG. 11 is a flow chart illustrating the process of enrichment of a work order.

FIG. 11 is a flow chart illustrating enrichment as initially described with reference to step 306 and FIG. 3. Referring to FIG. 11, the creation of enrichment data is more specifically described. In a step 1102, the specific workcenter on which manufacturing operations will be implemented is determined. The specific workcenter can be seen as an instance of a generic workcenter and thus inherits all generic definitions from the generic workcenter. Additionally, the specific workcenter is the base for all specific data definitions. The generic workcenter can be seen as the route of all workcenter-related definitions such as generic resources, enrichments, and setpoints 224. Thus, specific workcenters that share these definitions should be assigned to the same generic workcenter.

In a step 1104, business systems interface 452 creates fields in the work order database 454 to contain the enrichment data.

In step 1106, the generic workcenter to which the specific workcenter (as determined in step 1102) belongs is determined.

In a step 1108, all generic enrichment definitions defined for the generic workcenter determined in step 1106 are retrieved from the generic plant model. Generic enrichment definitions can include data needed to perform calculations on the specific workcenters belonging to the generic workcenter's family. Enrichments can be used for product characteristics (e.g., dimensions, specific weight), process data, and lab data (variable properties of raw materials). The definition also specifies how data is to be acquired.

Examples enrichment methods supported by manufacturing execution system 204 includes table lookup, solicited query from process control system 110 and process information system 108, manual input via terminal 462, and external system solicited query.

8.2 Setpoint Calculations

As discussed above, manufacturing execution system 204 calculates setpoints 224 and sends them to computerized manufacturing system 104. Setpoints 224 are sent to the address of a particular workcenter. The setpoint 224 feature is especially beneficial to batch-oriented plants that manufacture a variety of different products using a number of different methods deployed on a similar apparatus. An example of such a plant is a polycarbonate color compounding facility where thousands of different finished products can be distinguished on the basis of combinations of color related components.

Setpoints are used by process control system 110 within computerized manufacturing system 104 to set up for a manufacturing cycle to manufacture the product indicated in work order 222.

Calculation of setpoints 224 is based on two sources of input. These are manufacturing cycle order target data and enrichments.

Figure 6:
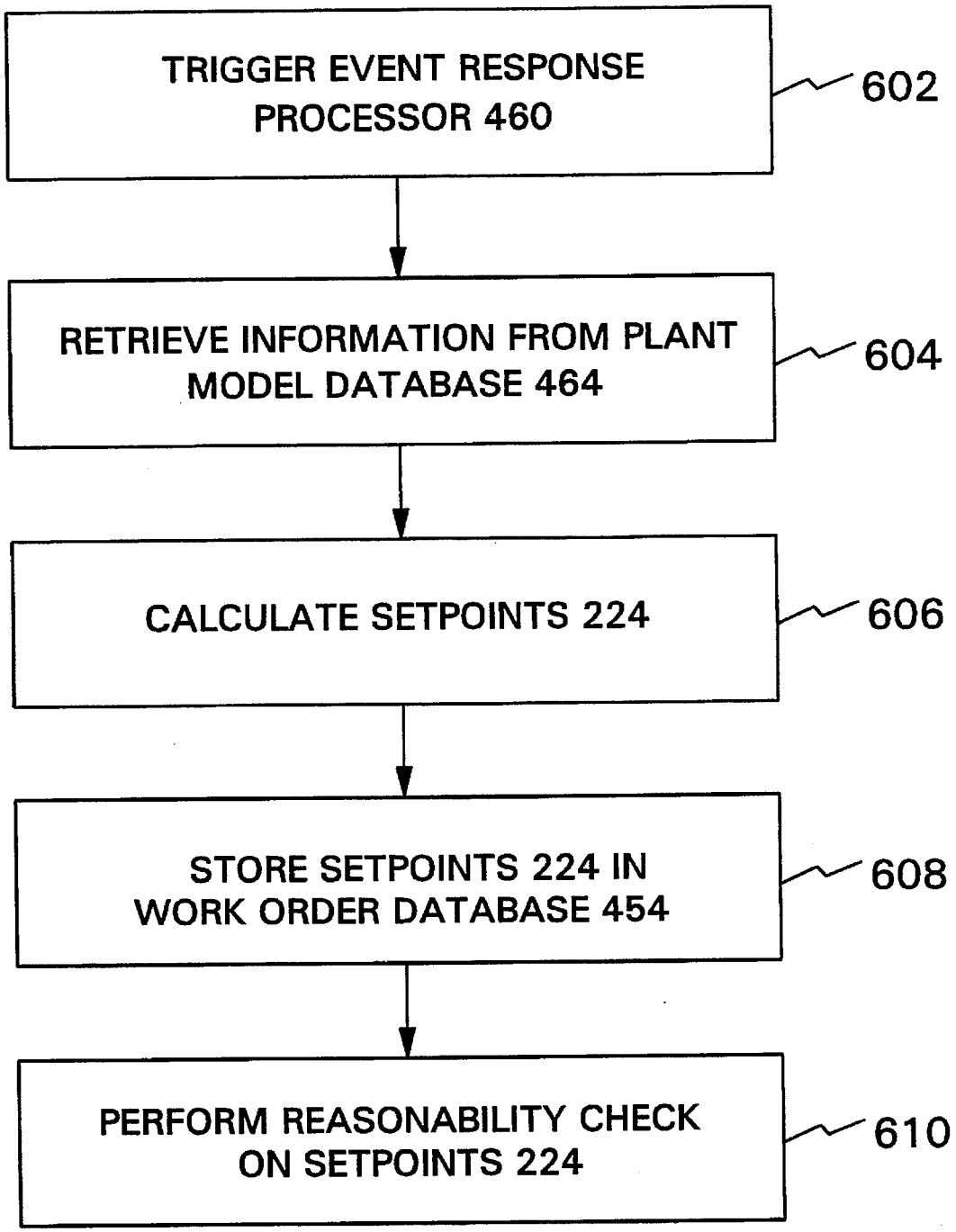
FIG. 6 is a flow chart illustrating the process of computing and storing setpoints.

FIG. 6 is a flow chart illustrating the process of calculating setpoints. Referring now to FIG. 6, in a step 602, event response processor 460 is triggered to begin the process of computing setpoints. This triggering can be a signal sent by shop floor control interface 458, or computerized manufacturing system 104. The trigger from shop floor control interface 458 may be a result of manual intervention of an operator at terminal 462. Note that setpoints can only be calculated after a work order 222 is received and enrichments have been performed for that work order 222.

In a step 604, event response processor 460 retrieves information from plant model database 464 indicating how the setpoints 224 are to be calculated. Information included in plant model database 464 is rules and equations for setpoint calculation based on the specific workcenter that is to carry out the work order. These rules provide calculations to be performed and enable conversion of values from those sent by computerized business system 102 to those values required by the specific workcenters in computerized manufacturing system 104.

In a step 606, setpoints are calculated based on the rules retrieved from plant model database 464. These calculations are performed using values from enrichments and/or from data included with work order 222.

In step 608, setpoints 224 are stored in work order database 454. A reasonability check is performed on the setpoints 224 in a step 610. The reasonability check can be performed by comparing the setpoints 224 with target data in work order database 454 and by using rules defined in plant model database 464. If a problem is made apparent, validation can take place.

Setpoint calculations can be either computations of data or table lookups of data. Examples of setpoints include flow rate, quantity of material to be manufactured, recipe number, ratio of materials used to make a product, quantity of a resource needed to manufacture a product, and the like.

In one embodiment, if in step 610 the values pass the reasonability checks, manufacturing execution system 204 indicates to the user successful calculation of setpoint 224, and the user can view setpoint 224. However, if an error is encountered, manufacturing execution system 204 indicates an error status and the operator may be prompted to take action to solve the problem and recalculate setpoint 224. Examples of an action required of the operator may be manual input for calculating enrichments, or validating the manufacturing cycle order recipe.

9. Plant Model Database

Manufacturing execution system 204 maps specific resources to the generic resource where specific resources have been defined as a part of a generic resource. For example, in a chocolate-chip cookie factory several different sweeteners (e.g., brown sugar, cane sugar, and confectioner's sugar) can be defined as part of a generic resource "sugar." In this example, when a work order is received each sugar is mapped into the generic "sugar."

Additionally, generic plant model 406 stores the definitions of which specific workstations are related to a generic class of workstation. This enables co-ordination of communication regarding modifications to the generic plant model in specific workstation instances so that non-generic aspects of specific workstation needs can be smoothly reconciled with the details and aspects of the generic plant model being referenced.

As previously discussed, a key feature of the invention is that it is highly portable. The manufacturing execution system 204 can be easily configured and reconfigured to operate in a variety of plant environments with different types of process control systems or different types of computerized manufacturing systems 104. Manufacturing execution system 204 can also be configured to conform to the reporting requirements of differing computerized business systems 102.

This system adaptability is provided through the use of plant model database 464. Plant model database 464 can include plant parameters. These plant parameters can include rules, definitions, data types, and other instructions to be used by manufacturing execution system 204 in handling work orders 222. The information in plant model database 464 is provided to give manufacturing execution system 204 instructions as to how to proceed with work order handling and event handling for each type of business system or manufacturing system with which manufacturing execution system 204 will interface.

If manufacturing execution system 204 is to be implemented in a new plant with differing interface requirements, this can be handled by simply changing the plant parameters. Similarly, if manufacturing execution system 204 is to be implemented in a plant where different data calculations are to be performed when an event is received, or different actions are required upon receipt of a work order 222, these changes can easily be made by changing the plant parameters in plant model database 464 to reflect the new action to be taken. This provides the system with a high degree of portability because only portions of plant model database 464 need to be modified to handle changes in business and manufacturing systems with which manufacturing execution system 204 interfaces.

A breakdown of plant model database 464 is provided in Table 2. At the highest level, plant model database 464 includes the generic plant model (as previously discussed) and a specific plant model. The specific plant model facilitates a generic-to-specific mapping functionality.

The specific plant model within plant model database 464 provides a mapping of specific items to their generic definitions. For example, the specific plant model provides a mapping of specific workcenters to the generic category (or class) of workcenter to which these specific workcenters belong. For workcenters, the specific plant model identifies specific workcenters within the plant, associates each specific workcenter to its generic model, maps specific resources to generic resources, provides a description of the workcenter, and provides an exact computerized business system name for the plant with which the workcenter is associated. Additional data is defined for each workcenter such as whether the workcenter is a manual or automatic workcenter, or whether data transmissions to computerized business system should be performed automatically.

Additionally, a specific rule set is provided indicating actions to be taken or calculations to be performed upon receipt of a specific work order 222, specific event from computerized manufacturing system 104, or other specific events. The rules can provide specific instructions to manufacturing execution system 204 as to what actions are to be taken. For example, the rule set may indicate that, when a specific event is received, data is to be retrieved from a particular source and certain computations are to be performed on the data collected and the computed data is to be sent to the computerized business system.

TABLE 2

| PLANT MODEL DATABASE |
| --- |
| A. Generic Plant Model |

TABLE 2-continued

| PLANT MODEL DATABASE |
| --- |
| See Table 1. |
| B. Specific Plant Model |
|   1. Specific Workcenters |
|   2. Specific Resources |
|   3. Specific Event Definitions |
|   4. Specific Data Tags |
|   5. Units of Measure |
|   6. Store Locations |
|   7. Specific Calculation Rules |

Table 2 - A

Generic Plant Model—for a complete description, see Table 1 and the accompanying text in Section 7 of this patent document.

Table 2 - B

A specific plant model is used to contain rules and data needed to handle specific situations in the plant with which manufacturing execution system 204 is associated, wherein a specific workcenter in that plant has minor deviations from the generic workcenter to which it belongs. This can include specific manufacturing operations on a specific workcenter and specific computations prompted by a specific event. The specific plant model contains rules and data that are not defined in the generic plant model because of unique attributes associated with specific workcenters.

Table 2 - B.1

Specific Workcenters—Identifies specific workcenters. Each specific workcenter is associated with a generic workcenter. In one embodiment, each specific workcenter also identifies a business system identifier and additional data related to an associated business system workcenter.

Table 2 - B.2

Specific Resources—Identifies all of the specific resources used by a particular manufacturing plant. Specific resources are mapped to appropriate generic resources (within generic plant model 406) so that manufacturing executive system 204 material identifiers relate to computerized business system 102 identifiers. Specific resources are received by the manufacturing execution system 204 in the materials master 236 data message. The related materials master 236 communications (from which the resource information in the Generic Plant Model and the Specific Plant Model is derived) include material identifiers for computerized business system 102, a description of each material listed, stock and issue units for the materials in business system terms, and conversions between stock and issue units.

Table 2 - B.3

Specific Event Definitions—Identifies the specific event identifiers for each occurrence related to a generic workcenter event.

Specific event definitions identify the specific events that can be received as a result of the manufacturing process. These definitions reference data to be gathered in response to the event and subsequent actions and calculations to be performed. Additionally, other events specific to the plant but not in generic plant model 406 can be defined here.

The event definitions portion of the specific plant model provides a unique identifier to every event that can be received from computerized manufacturing system 104.

Table 2 - B.4

Specific Data Tags—Identifies the specific address in computerized manufacturing system 104 where specific data is located. This indicates, for example, where setpoints 232, are to be stored in computerized manufacturing system 104, and where enrichments, accounting data, and manufacturing data 226 are located.

For every specific workstation there is a data tag for each generic resource of the workcenter specifying the address in computerized manufacturing system 104.

In one embodiment, a copy of each data tag, and its associated data, is temporarily retained after the conclusion of a manufacturing cycle in the computerized manufacturing system 104 to facilitate reporting. The second instance is deleted after report generation. Thus, computerized manufacturing system 104 can begin executing subsequent manufacturing cycles before manufacturing execution system 204 completes reporting on the previous cycle.

Table 2 - B.5

Units of Measure—Defines the valid units of measure for the plant. The units of measure portion of the model contains valid units of measure for each variable to be encountered by manufacturing execution system 204. Additionally, the units of measure portion relates units of variables used within the manufacturing execution system 204 to units of variables within computerized business system 102. The units of measure portion facilitates automatic unit conversion so that variables can be communicated between manufacturing execution system 204 and computerized business system 102.

Table 2 - B.6

Store Locations—Defines and identifies store locations that may hold raw materials, finished products, or in-process products. These storage locations may be identified in terms of identifiers such as tank number, bin number, warehouse location, and the like. Additionally, the store locations portion maps manufacturing execution system 204 location codes to those location codes recognized by computerized manufacturing system 104 and computerized business system 102.

Table 2 - B.7

Specific Calculation Rules—includes rules used to compute accounting and process data and setpoints to accommodate unique attributes within a workcenter. Exceptions from the generic model can be included here.

In an alternative embodiment, generic plant model 406 could include an exceptions portion wherein specific instances of calculation rules could be identified.

10. Batch and Continuous Accounting

Manufacturing data management 208 has provisions to account for manufacturing data 226. See the definitions section within this specification for a definition of process accounting within the context of the present invention. For purposes of this specification, process accounting are considered in the batch and continuous manufacturing paradigm contexts introduced in the earlier part of the specification; so batch accounting and continuous accounting are discussed as two "theoretical paradigm types" to enable a complete understanding of the invention. In practice, both of the theoretical paradigm types might be concurrently deployed in the process accounting related to a particular plant.

10.1 Batch Accounting

Batch accounting is performed within the context of the batch paradigm to facilitate an operations summary or process accounting related to a manufacturing cycle executed on a certain manufacturing workcenter. In the interaction of manufacturing execution system 204 with computerized business system 102, a manufacturing cycle order and its related target data are created after the transmissions of work order 222 from computerized business system 102 to manufacturing execution system 204. In a second scenario wherein the computerized business system 102 is not electronically linked to manufacturing execution system 204, a skeleton manufacturing cycle order, which lacks target data, is created automatically by manufacturing execution system 204 when process control system 110 within computerized manufacturing system 104 sends an event to event response processor 460 signalling the initiation of a manufacturing cycle (or "run") to manufacture a batch of product.

When the batch starts, data can be collected automatically either at regular intervals or upon receipt of events from process control system 110. Data collection continues until the end of a batch run is signaled.

Several data attributes can be collected. These attributes include material identifier, batch number, and store location. Each of these attributes are now be described.

A material identifier identifies a raw material, process requirement such as energy or time, or the finished product from another manufacturing cycle which is a raw material to the relevant manufacturing cycle being initiated. If manufacturing execution system 204 is used with computerized business system 102, material codes match those used by computerized business system 102 as required.

Lot numbers apply to raw materials and finished products. When used in conjunction with computerized business system 102, finished-product lot numbers are assigned in accordance with computerized business system 102 formats.

A store location is a place used to store materials (e.g., a tank or a silo). When used with computerized business system 102, store locations in manufacturing execution system 204 match those in computerized business system 102.

10.2 Continuous Accounting

Figure 10:
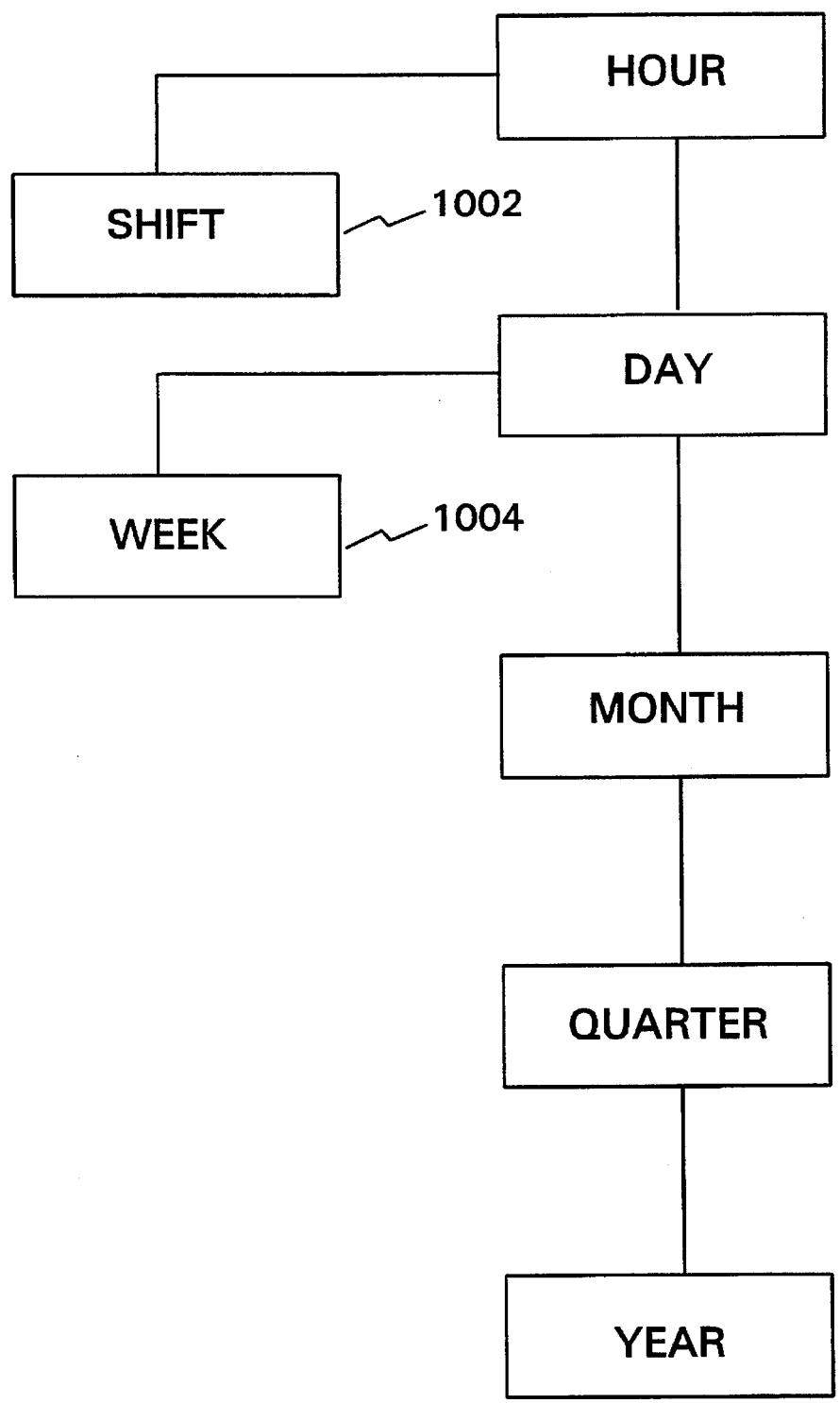
FIG. 10 is a figure illustrating hierarchies used in summarizing data.

Continuous accounting is done at predefined, fixed-time intervals. Numerous hierarchies can be defined for selection of continuous accounting intervals. FIG. 10 depicts the hierarchy provided by manufacturing execution system 204 in one embodiment. In this embodiment, accounting intervals defined by shifts (box 1002) and defined by weeks (box 1004) are optional. According to the hierarchy of the preferred embodiment, data collection occurs on an hourly or daily basis. However, hourly data is usually stored for only a few days to minimize use of disk space on the manufacturing execution system 204. In alternative embodiments, data can be collected and stored using other time intervals.

11. Inventory Support

To fully utilize computerized business system 102, it is important to maintain its inventory data as accurately as possible. With conventional systems, a high number of manual interactions are required that are not only time consuming but also have a very high potential for the introduction of error. The present invention facilitates inventory-related transactions by automating the transfer of data from process control systems 110 and automates these transactions. In doing this, manufacturing execution system 204 transfers data related to stock counts, material transfers, shipping orders, and receipts.

Stock counts are used for automatic correction of computerized business system 102 data; a typical example is a tank level reading. Most computerized business systems 102 require stocks counts to be taken at periodic intervals to ensure the accuracy of inventory data. Most computerized business systems 102 require stock counts to be taken at periodic intervals to maintain inventory data. Manufacturing execution system 204 supports stock counts via process control system 110 by extracting relevant pieces of plant/batch accounting data at regular intervals and transmitting this data to computerized business system 102.

Stock counts are implemented in manufacturing execution system 204 using continuous accounting data. Stock counts can be scheduled to be done when an event occurs (e.g., at the end of a shift, day, or week) or can be manually requested. When a stock count is to be done, the correct data for the stock count is retrieved from the continuous accounting data stored in plant database 408.

Stock levels that can be measured by a process control system 110 are supported automatically by the stock count process of manufacturing execution system 204.

Data involved in stock counts can include material identifiers, generic resources, quantities, units of measure, store locations, and the like.

Manufacturing execution system 204 uses the generic concept when facilitating the data structure for stock counts. Generic collections are created for the event type and the generic resources to be transmitted for the stock count. A generic workcenter action is created for stock count event type and a generic upload is created for the generic workcenter action that specifies the type of upload for the stock count.

The generic workcenter action specifies an event type that is processed for the related generic workcenter and the actions to take place once an event of that type occurs. These actions can include printing generic reports, performing generic data transmissions, unifying external systems at the beginning and/or end of processing the event, and invoking an external system to obtain data.

The generic resource is the basis for data that manufacturing execution system 204 collects, accounts, reports, or calculates. A generic resource is always defined for a generic workcenter and may relate to at least one resource with similar properties and functions. Important definitions made for a generic resource include what data should be retrieved (quantity, resource, store location, and the like), how to retrieve the data, and in what unit of measure the quantity should be stored.

The generic collection is a cross-reference between the generic workcenter action and the generic resource. It specifies which generic resource should be collected and calculated in the course of processing the generic workcenter action.

The generic upload stands for data to be extracted and sent to computerized business system 102 in a specified format for processing. Examples include operation confirmation, raw material usage booking, and finished product receipt.

A material transfer is the relocation of a certain quantity of material. Such a transfer must be communicated to computerized business system 102 in order to keep its inventory data up-to-date. Manufacturing execution system 204 automatically provides updates to computerized business system 102 for material transfers done under the control of a process control system 110.

When a material transfer occurs, manufacturing execution system 204 defines an event type of material transfer along with the necessary specific workcenter event to define when the event will occur. Generic collections are created for the event type as are the generic resources to be used for the material transfer.

A generic workcenter action is created for the material transfer event type, and a generic upload is created for the generic workcenter action that specifies the type of upload for the material transfer.

Data involved with material transfers include material identifiers, quantity, unit of measure, store location source, and store location destination.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-based system for integrating a computerized business system with a computerized manufacturing system, wherein the computerized business system creates a work order containing data specifying a product to be manufactured by the computerized manufacturing system, comprising:

a business systems interface configured to receive the work order from the computerized business system and to extract the data from the received work order; and an event response processor coupled to said business system interface and configured to apply at least one rule to said extracted data to generate one or more setpoints, and to provide said one or more setpoints to the computerized manufacturing system, wherein said one or more setpoints are manufacturing process settings used to manufacture the product.

2. The computer-based system of claim 1, further comprising a plant model database configured to store said at least one rule.

3. The computer-based system of claim 1, further comprising a work order database configured to store the target data.

4. The computer-based system of claim 2, further comprising a configuration management element coupled to said plant model database, said configuration management element allowing a user to configure said rule in said plant model database for the computerized-manufacturing system.

5. The computer-based system of claim 1, further comprising a shop floor control interface coupled to and providing an operator interface to said event response processor.

6. The computer-based system of claim 1, further comprising a process information system coupled to and providing said event response processor with a common interface to a plurality of process control systems having different interface characteristics in the computerized manufacturing system.

7. The computer-based system of claim 6, wherein said process information system comprises an event dispatch subsystem configured to receive events from the computerized manufacturing system and forward said events to said event response processor.

8. The computer-based system of claim 6, wherein said process information system comprises an information retrieval subsystem configured to retrieve manufacturing data from the computerized manufacturing system and forward said manufacturing data to said event response processor.

9. The computer-based system of claim 8, wherein said process information system further comprises a device driver, coupled to said information retrieval subsystem, configured to provide an interface to and accommodate unique communication requirements of said plurality of process control systems.

10. The computer-based system of claim 5, wherein said shop floor control interface comprises a terminal configured to accept data entry from a human operator.

11. The computer-based system of claim 1, wherein said event response processor further comprises:

means for receiving a process event from the computerized manufacturing system, said process event indicating the occurrence of manufacturing milestones; and means for retrieving manufacturing data from said computerized manufacturing system in response to said process event.

12. The computer-based system of claim 11, wherein said event response processor further comprises means for applying at least one calculation rule to said retrieved manufacturing data to calculate work order data to be reported to said computerized business system.

13. A computer-integrated manufacturing system, comprising:

a computerized business system configured to create a work order, wherein said work order comprises data specifying a product to be manufactured;

a computerized manufacturing system configured to manufacture said specified product in response to at least one setpoint; and an event response processor coupled to said computerized business system and said computerized manufacturing system, configured to apply at least one rule to said extracted data to generate one or more setpoints, and to provide said one or more setpoints to the computerized manufacturing system, wherein said one or more setpoints are manufacturing process settings used to manufacture the product and wherein said rule specifies computation of said one or more setpoints to meet specific requirements of said computerized manufacturing system.

14. The computer-integrated manufacturing system of claim 13, wherein said computerized manufacturing system comprises at least one workcenter configured to manufacture said specified product.

15. The computer-integrated manufacturing system of claim 13, further comprising a business systems interface configured to receive the work order from the computerized business system and to extract said target data from the received work order.

16. The computer-integrated manufacturing system of claim 13, further comprising a plant model database coupled to said event response processor and configured to store said at least one rule.

17. The computer-integrated manufacturing system of claim 13, further comprising a work order database coupled to said event response processor and configured to store said target data.

18. The computer-integrated manufacturing system of claim 16, further comprising a configuration management element coupled to said plant model database, said configuration management element allowing a user to configure said at least one rule in said plant model database specifically for said computerized-manufacturing system.

19. The computer-integrated manufacturing system of claim 13, further comprising a shop floor control interface coupled to and providing an operator interface to said event response processor.

20. The computer-integrated manufacturing system of claim 13, further comprising a process information system coupled to and providing said event response processor with a common interface to a plurality of process control systems having different interface characteristics in said computerized manufacturing system.

21. The computer-integrated manufacturing system of claim 20, wherein said process information system comprises an event dispatch subsystem configured to receive events from said computerized manufacturing system and to forward said events to said event response processor.

22. The computer-integrated manufacturing system of claim 20 wherein said process information system comprises an information retrieval subsystem configured to retrieve manufacturing data from said computerized manufacturing system and to forward said manufacturing data to said event response processor.

23. The computer integrated manufacturing system of claim 22, wherein said process information system further comprises a device driver, coupled to said information retrieval subsystem, configured to provide an interface to and accommodate unique communication requirements of said plurality of process control systems.

24. The computer integrated manufacturing system of claim 19, wherein said shop floor control interface comprises a terminal configured to accept data entry from a human operator.

25. The computer integrated manufacturing system of claim 13, wherein said event response processor further comprises:

means for receiving a process event from the computerized manufacturing system, said process event indicating the occurrence of manufacturing milestones; and means for retrieving manufacturing data from said computerized business system in response to said process event.

26. The computer integrated manufacturing system of claim 25, wherein said event response processor further comprises means for applying at least one calculation rule to said retrieved manufacturing data to calculate work order data to be reported to said computerized business system.

27. A computer-based method of integrating a computerized business system with a computerized manufacturing system, comprising the steps of:

(a) receiving a work order from the computerized business system, wherein said work order comprises data specifying a product to be manufactured by the computerized manufacturing system;

(b) applying at least one setpoint calculation rule to said data to compute a setpoint required by the computerized manufacturing system, wherein said setpoint comprises one or more manufacturing process settings used to manufacture said specified product and wherein said setpoint calculation rule specifies computation of said setpoint to meet specific requirements of said computerized manufacturing system; and (c) sending said setpoint to the computerized manufacturing system.

28. The computer-based method of claim 27, further comprising the steps of:

(d) receiving a process event indicating the occurrence of a manufacturing milestone;

(e) retrieving manufacturing data from the computerized manufacturing system in response to said process event; and (f) applying at least one data calculation rule to said retrieved manufacturing data to calculate work order data.

29. The computer-based method of claim 27, further comprises the step of entering said target data in a database.

30. The computer-based method of claim 29, further comprising the step of modifying the size of said database to hold at least one additional field for manufacturing data to be collected during manufacturing operations.

31. The computer-based method of claim 27, further comprising the step of enriching said work order to include enrichment data, wherein said enrichment data is used in computing said setpoint in said step (b).

32. The computer based method of claim 31, wherein said step of enriching said work order data comprises the steps of:

(i) determining a specific workcenter for manufacturing said specified product;

(ii) determining a generic workcenter class to which said specific workcenter belongs; and (iii) receiving generic enrichment data for said generic workcenter class.

33. The computer based method of claim 32, further comprising the step of storing said enrichment data in a database.

34. The computer based method of claim 32, wherein said step of receiving generic enrichment data further comprises accepting manual input of enrichment data from an operator terminal.

35. The computer based method of claim 32, wherein said step of receiving generic enrichment data comprises retrieving enrichment data from the computerized manufacturing system.

36. The computer based method of claim 32, wherein said step of receiving generic enrichment data comprises retrieving enrichment data from a database.

37. The computer-based method of claim 28, further comprising the steps of:

(g) applying at least one calculation rule to said manufacturing data to calculate work order data; and (h) sending said work order data to the computerized manufacturing system.

38. A computer-based system for integrating a computerized business system with a computerized manufacturing system, comprising:

interface means for receiving a work order from the computerized business system, wherein said work order comprises data specifying a product to be manufactured by the computerized manufacturing system; and setpoint determination means, coupled to said computerized manufacturing system, for applying at least one setpoint calculation rule to said data to compute a setpoint required by the computerized manufacturing system to manufacture said specified product:

wherein said setpoint comprises one or more manufacturing process settings used to manufacture said specified product and wherein said setpoint calculation rule specifies computation of said setpoint to meet specific requirements of said computerized manufacturing system.

39. The computer-based system of claim 38, wherein said setpoint determination means comprises:

first means for receiving a process event from said computerized manufacturing system indicating the occurrence of a manufacturing milestone;

second means, coupled to said first means, for retrieving manufacturing data from the computerized manufacturing system in response to said process event; and third means, coupled to said second means, for calculating work order data by applying at least one data calculation rule to said manufacturing data.

40. The computer-based method of claim 38, further comprising means for storing said target data.

41. The computer based method of claim 38, further comprising means for enriching said work order to include enrichment data, said enrichment data used to compute said setpoint.

42. The system of claim 38, further comprising storage means for storing a plurality of setpoint calculation rules, wherein said at least one setpoint calculation rule is chosen from among said plurality of setpoint calculation rules based on which one of a plurality of computerized manufacturing systems is to manufacture the product.

* * * * *